(12) United States Patent
Sasaki et al.

(10) Patent No.: US 8,194,511 B2
(45) Date of Patent: Jun. 5, 2012

(54) HEAT-ASSISTED MAGNETIC RECORDING HEAD WITH NEAR-FIELD LIGHT GENERATING ELEMENT

(75) Inventors: Yoshitaka Sasaki, Milpitas, CA (US); Hiroyuki Ito, Milpitas, CA (US); Shigeki Tanemura, Milpitas, CA (US); Hironori Araki, Milpitas, CA (US); Atsushi Iijima, Shatin (CN)

(73) Assignees: Headway Technologies, Inc., Milpitas, CA (US); TDK Corporation, Tokyo (JP)

( * ) Notice: Subject to any disclaimer, the term of this patent is extended or adjusted under 35 U.S.C. 154(b) by 69 days.

(21) Appl. No.: 12/727,666

(22) Filed: Mar. 19, 2010

(65) Prior Publication Data
US 2011/0228418 A1 Sep. 22, 2011

(51) Int. Cl.
*G11B 11/00* (2006.01)
(52) U.S. Cl. .................. 369/13.33; 369/112.27
(58) Field of Classification Search ............... 369/13.33, 369/13.13, 13.12, 13.03, 13.32, 112.09, 112.16, 369/112.21, 112.27; 360/59, 245.3, 125.31, 360/123.11
See application file for complete search history.

(56) References Cited

U.S. PATENT DOCUMENTS

| 6,649,894 | B2 | 11/2003 | Matsumoto et al. | |
|---|---|---|---|---|
| 7,911,883 | B2 * | 3/2011 | Sasaki et al. | 369/13.33 |
| 8,000,175 | B2 * | 8/2011 | Shimazawa et al. | 369/13.13 |
| 2006/0233062 | A1 | 10/2006 | Bedillion et al. | |

| 2007/0165494 | A1 | 7/2007 | Cho et al. |
|---|---|---|---|
| 2008/0002298 | A1 | 1/2008 | Sluzewski |
| 2008/0055762 | A1 | 3/2008 | Shimazawa et al. |
| 2010/0061200 | A1 | 3/2010 | Shimazawa et al. |
| 2010/0073802 | A1 | 3/2010 | Komura et al. |
| 2010/0118431 | A1 | 5/2010 | Tomikawa et al. |
| 2010/0172220 | A1 | 7/2010 | Komura et al. |
| 2010/0195238 | A1 | 8/2010 | Shimazawa et al. |
| 2010/0202081 | A1 | 8/2010 | Shimazawa et al. |

(Continued)

FOREIGN PATENT DOCUMENTS

JP A-2003-114184 4/2003

(Continued)

OTHER PUBLICATIONS

May 27, 2011 Office Action for U.S. Appl. No. 12/385,447.

(Continued)

*Primary Examiner* — Ali Neyzari
(74) *Attorney, Agent, or Firm* — Oliff & Berridge, PLC

(57) ABSTRACT

A near-field light generating element has an outer surface including a bottom surface that lies at an end closer to a top surface of a substrate, a waveguide facing surface that lies at an end farther from the top surface of the substrate and faces a waveguide, a front end face located in a medium facing surface, and a side surface that connects the bottom surface, the waveguide facing surface and the front end face to each other. The front end face includes a first side that lies at an end of the bottom surface, a tip that lies at an end farther from the top surface of the substrate and forms a near-field light generating part, a second side that connects an end of the first side to the tip, and a third side that connects the other end of the first side to the tip. The waveguide facing surface includes a width changing portion that has a width in a direction parallel to the bottom surface and the front end face, the width decreasing with decreasing distance to the front end face.

7 Claims, 32 Drawing Sheets

U.S. PATENT DOCUMENTS

| | | | |
|---|---|---|---|
| 2010/0238580 A1 | 9/2010 | Shimazawa et al. | |
| 2010/0290323 A1* | 11/2010 | Isogai et al. | 369/13.24 |
| 2010/0328806 A1 | 12/2010 | Sasaki et al. | |
| 2011/0013497 A1 | 1/2011 | Sasaki et al. | |
| 2011/0026377 A1 | 2/2011 | Shimazawa et al. | |
| 2011/0058273 A1 | 3/2011 | Sasaki et al. | |
| 2011/0096435 A1 | 4/2011 | Sasaki et al. | |
| 2011/0096639 A1 | 4/2011 | Matsumoto | |
| 2011/0149426 A1 | 6/2011 | Araki et al. | |
| 2011/0228417 A1* | 9/2011 | Sasaki et al. | 360/59 |

FOREIGN PATENT DOCUMENTS

| | | |
|---|---|---|
| JP | A-2005-004901 | 1/2005 |
| JP | A-2007-257753 | 10/2007 |
| JP | A-2008-016096 | 1/2008 |
| JP | A 2008-257819 | 10/2008 |
| JP | A 2009-150899 | 7/2009 |
| JP | A 2011-134428 | 7/2011 |

OTHER PUBLICATIONS

Co-pending U.S. Appl. No. 12/385,447, filed Apr. 8, 2009.
Yoshitaka Sasaki et al., U.S. Appl. No. 12/385,447, filed Apr. 8, 2009.
Yoshitaka Sasaki et al., U.S. Appl. No. 12/457,984, filed Jun. 26, 2009.
Yoshitaka Sasaki et al., U.S. Appl. No. 12/458,546, filed Jul. 15, 2009.
Yoshitaka Sasaki et al., U.S. Appl. No. 12/585,150, filed Sep. 4, 2009.
Yoshitaka Sasaki et al., U.S. Appl. No. 12/714,998, filed Mar. 1, 2010.
Yoshitaka Sasaki et al., U.S. Appl. No. 12/727,620, filed Mar. 19, 2010.
Challener W.A., et al. "Heat-Assisted Magnetic Recording by a Near-Field Transducer with Efficient Optical Energy Transfer," Nature Photonics, Mar. 2009, pp. 1-5, Seagate Technology, Pittsburgh, PA.
Mar. 16, 2012 Office Action issued in Japanese patent application No. 2010-211997 (with translation).
Mar. 16, 2012 Office Action issued in Japanese Patent application No. 2010-211998 (with translation).

* cited by examiner

HEAT-ASSISTED MAGNETIC RECORDING HEAD WITH NEAR-FIELD LIGHT GENERATING ELEMENT

BACKGROUND OF THE INVENTION

Field of the Invention

The present invention relates to a near-field light generating element for use in heat-assisted magnetic recording where a recording medium is irradiated with near-field light to lower the coercivity of the recording medium for data writing, a method of manufacturing the same, and a heat-assisted magnetic recording head that includes the near-field light generating element.

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head including a magnetoresistive element (hereinafter, also referred to as MR element) for reading and a write head including an induction-type electromagnetic transducer for writing are stacked on a substrate. In a magnetic disk drive, the thin-film magnetic head is mounted on a slider that flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technique so-called heat-assisted magnetic recording. This technique uses a recording medium having high coercivity. When writing data, a magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in heat-assisted magnetic recording will be referred to as a heat-assisted magnetic recording head.

In heat-assisted magnetic recording, near-field light is typically used as a means for applying heat to the recording medium. A known method for generating near-field light is to apply laser light to a plasmon antenna, which is a small piece of metal, as described in U.S. Patent Application Publication No. 2008/0055762 A1, for example. The laser light applied to the plasmon antenna excites surface plasmons on the plasmon antenna, and near-field light is generated based on the surface plasmons. The near-field light generated by the plasmon antenna exists only within an area smaller than the diffraction limit of light. Irradiating the recording medium with the near-field light makes it possible to heat only a small area of the recording medium.

In a conventional heat-assisted magnetic recording head, the plasmon antenna is directly irradiated with laser light, so that the plasmon antenna transforms the laser light into near-field light. In this case, there is the problem of poor use efficiency of the laser light since the laser light can be reflected at the surface of the plasmon antenna or can be converted into thermal energy and absorbed by the plasmon antenna.

Having a size smaller than the wavelength of the light, the conventional plasmon antenna is small in volume. The conventional plasmon antenna therefore shows a large increase in temperature when absorbing the thermal energy. This results in problems such as the problem that the plasmon antenna expands and protrudes from a medium facing surface, a surface that faces the recording medium, to damage the recording medium.

To cope with this, there has been proposed the technique of arranging a waveguide so that its outer surface is opposed to the outer surface of a near-field light generating element, a piece of metal for generating near-field light, with a predetermined distance therebetween. Light propagated through the wave guide is totally reflected by the outer surface of the waveguide to generate evanescent light, and this evanescent light is utilized to excite surface plasmons on the near-field light generating element.

A heat-assisted magnetic recording head may be configured so that an end face of a magnetic pole that produces a write magnetic field is located on the trailing side relative to a front end face of the near-field light generating element in the medium facing surface. The trailing side relative to a reference position refers to the side closer to the air outflow end of the slider relative to the reference position. The trailing side typically falls on the side farther from the top surface of the substrate relative to the reference position. When the above-described configuration is employed, the front end face of the near-field light generating element preferably has a top end of a pointed shape so that a near-field light generating part is formed near the top end of the front end face. The near-field light generating element having the front end face of such a configuration may have the shape of a triangular prism with an edge part at the top end. In such a case, the heat-assisted magnetic recording head may be configured so that the outer surface of the waveguide is opposed to the edge part of the near-field light generating element with a predetermined distance therebetween in order to excite surface plasmons on the near-field light generating element by using evanescent light.

The foregoing configuration, however, has the problem that the region where the edge part of the near-field light generating element and the outer surface of the waveguide are opposed to each other is so small in area that it is difficult to excite a lot of surface plasmons on the near-field light generating element.

OBJECT AND SUMMARY OF THE INVENTION

It is an object of the present invention to provide a near-field light generating element in which a tip for forming a near-field light generating part is formed at the top end of the front end face, the near-field light generating element being capable of exciting a lot of surface plasmons and concentrating the surface plasmons at the near-field light generating part, and to provide a method of manufacturing the near-field light generating element, and a heat-assisted magnetic recording head including the near-field light generating element.

A near-field light generating element of the present invention is for use in a heat-assisted magnetic recording head. The heat-assisted magnetic recording head includes: a medium facing surface that faces a recording medium; a magnetic pole; a waveguide that propagates light; the near-field light generating element; and a substrate having a top surface. The magnetic pole has an end face located in the medium facing surface and produces a write magnetic field for writing data on the recording medium. The near-field light generating element has a near-field light generating part located in the medium facing surface. A surface plasmon is excited based on the light propagated through the waveguide. The surface plasmon is propagated to the near-field light generating part. The near-field light generating part generates near-field light based on the surface plasmon. The near-field light generating element, the magnetic pole, and the waveguide are disposed above the top surface of the substrate.

The near-field light generating element of the present invention has an outer surface. The outer surface includes: a bottom surface that lies at an end closer to the top surface of the substrate; a waveguide facing surface that lies at an end farther from the top surface of the substrate and faces the waveguide; a front end face that is located in the medium facing surface; and a side surface that connects the bottom surface, the waveguide facing surface, and the front end face to each other. The front end face includes: a first side that lies at an end of the bottom surface; a tip that lies at an end farther from the top surface of the substrate and forms the near-field light generating part; a second side that connects an end of the first side to the tip; and a third side that connects the other end of the first side to the tip. The waveguide facing surface includes a width changing portion. The width changing portion has a width in a direction parallel to the bottom surface and the front end face, the width decreasing with decreasing distance to the front end face.

In the near-field light generating element of the present invention, a cross section parallel to the bottom surface may decrease in size with increasing distance from the bottom surface.

In the near-field light generating element of the present invention, the waveguide facing surface may have a front end part that is closer to the front end face. The front end part may be located away from the front end face. In such a case, the outer surface of the near-field light generating element may further include an edge part that connects the front end part to the tip of the front end face. When the front end part is located away from the front end face, the waveguide facing surface may be located closer to the bottom surface than is the tip of the front end face.

A first method of manufacturing the near-field light generating element of the present invention includes: a step of forming a metal layer that is to be etched later to become the near-field light generating element; a first etching step of etching the metal layer so that the metal layer is provided with a part of the side surface continuous with the second side of the front end face; and a second etching step of etching the metal layer so that the waveguide facing surface and the side surface are completed and the metal layer thereby becomes the near-field light generating element.

A second method of manufacturing the near-field light generating element of the present invention includes: a step of forming a metal layer that is to be etched later to become the near-field light generating element; a step of forming a polishing stopper layer on the metal layer, the polishing stopper layer being intended for use in a polishing step to be performed later; a first etching step of etching the polishing stopper layer and the metal layer so that the metal layer is provided with a part of the side surface continuous with the second side of the front end face; a step of forming a coating layer to cover the polishing stopper layer and the metal layer provided with the part of the side surface, the coating layer being made of a non-metallic inorganic material that has an etching rate lower than that of the metal layer in a second etching step to be performed later; the polishing step of polishing the coating layer until the polishing stopper layer is exposed; and the second etching step of etching the polishing stopper layer and the metal layer so that the waveguide facing surface and the side surface are completed and the metal layer thereby becomes the near-field light generating element.

In the second method of manufacturing the near-field light generating element of the present invention, a part of the near-field light generating element including the tip is shaped by etching the metal layer in the second etching step, using the coating layer polished in the polishing step as an etching mask.

In the second method of manufacturing the near-field light generating element of the present invention, the coating layer may be made of one selected from the group consisting of $Al_2O_3$, $SiO_2$, $Ta_2O_5$, SiC, and TiN.

A heat-assisted magnetic recording head of the present invention includes: a medium facing surface that faces a recording medium; a magnetic pole; a waveguide that propagates light; a near-field light generating element; and a substrate having a top surface. The magnetic pole has an end face located in the medium facing surface and produces a write magnetic field for writing data on the recording medium. The near-field light generating element has a near-field light generating part located in the medium facing surface. A surface plasmon is excited based on the light propagated through the waveguide. The surface plasmon is propagated to the near-field light generating part. The near-field light generating part generates near-field light based on the surface plasmon. The near-field light generating element, the magnetic pole, and the waveguide are disposed above the top surface of the substrate.

In the heat-assisted magnetic recording head of the present invention, the near-field light generating element has an outer surface. The outer surface includes: a bottom surface that lies at an end closer to the top surface of the substrate; a waveguide facing surface that lies at an end farther from the top surface of the substrate and faces the waveguide; a front end face that is located in the medium facing surface; and a side surface that connects the bottom surface, the waveguide facing surface, and the front end face to each other. The front end face includes: a first side that lies at an end of the bottom surface; a tip that lies at an end farther from the top surface of the substrate and forms the near-field light generating part; a second side that connects an end of the first side to the tip; and a third side that connects the other end of the first side to the tip. The waveguide facing surface includes a width changing portion. The width changing portion has a width in a direction parallel to the bottom surface and the front end face, the width decreasing with decreasing distance to the front end face.

In the heat-assisted magnetic recording head of the present invention, a cross section of the near-field light generating element parallel to the bottom surface may decrease in size with increasing distance from the bottom surface.

In the heat-assisted magnetic recording head of the present invention, the waveguide facing surface may have a front end part that is closer to the front end face. The front end part may be located away from the front end face. In such a case, the outer surface of the near-field light generating element may further include an edge part that connects the front end part to the tip of the front end face. When the front end part is located away from the front end face, the waveguide facing surface may be located closer to the bottom surface than is the tip of the front end face.

In the heat-assisted magnetic recording head of the present invention, the end face of the magnetic pole may be located at such a position that the tip lies between the end face of the magnetic pole and the first side of the front end face of the near-field light generating element.

In the near-field light generating element, the method of manufacturing the same, and the heat-assisted magnetic recording head of the present invention, the outer surface of the near-field light generating element includes the bottom surface, the waveguide facing surface that lies at the end farther from the top surface of the substrate and faces the waveguide, the front end face located in the medium facing surface, and the side surface. The front end face includes the tip. The tip lies at the end farther from the top surface of the substrate and forms the near-field light generating part. The waveguide facing surface includes the width changing portion. The width changing portion has a width in the direction parallel to the bottom surface and the front end face, the width decreasing with decreasing distance to the front end face. Consequently, according to the present invention, it is possible to excite a lot of surface plasmons on the waveguide facing surface and to concentrate the surface plasmons at the near-field light generating part. The present invention thus makes it possible to excite a lot of surface plasmons in the near-field light generating element having the tip for forming the near-field generating part at the top end of the front end face, and to concentrate the surface plasmons at the near-field light generating part.

Other and further objects, features and advantages of the present invention will appear more fully from the following description.

DETAILED DESCRIPTION OF THE PREFERRED EMBODIMENTS

[First Embodiment]

Figure 3:
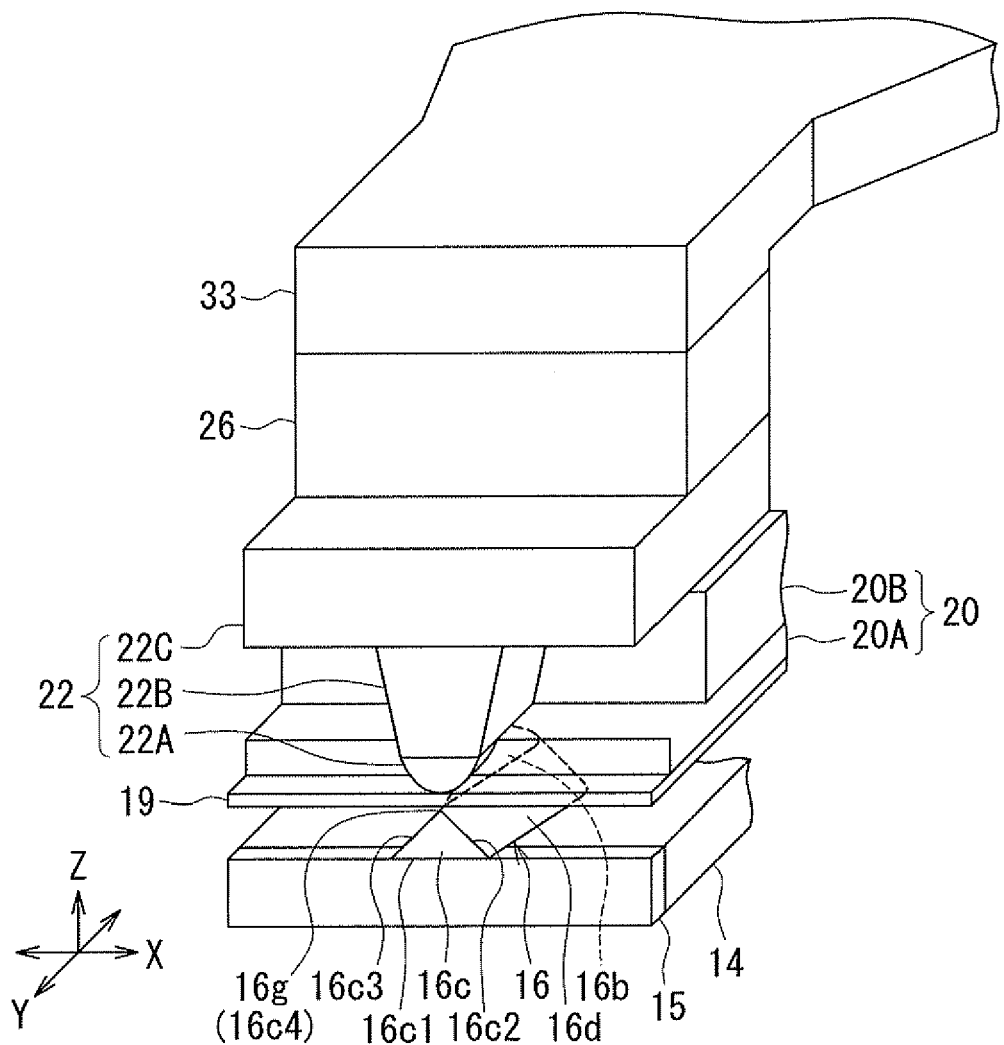
FIG. 3 is a perspective view showing the main part of a heat-assisted magnetic recording head according to the first embodiment of the invention.
Figure 4:
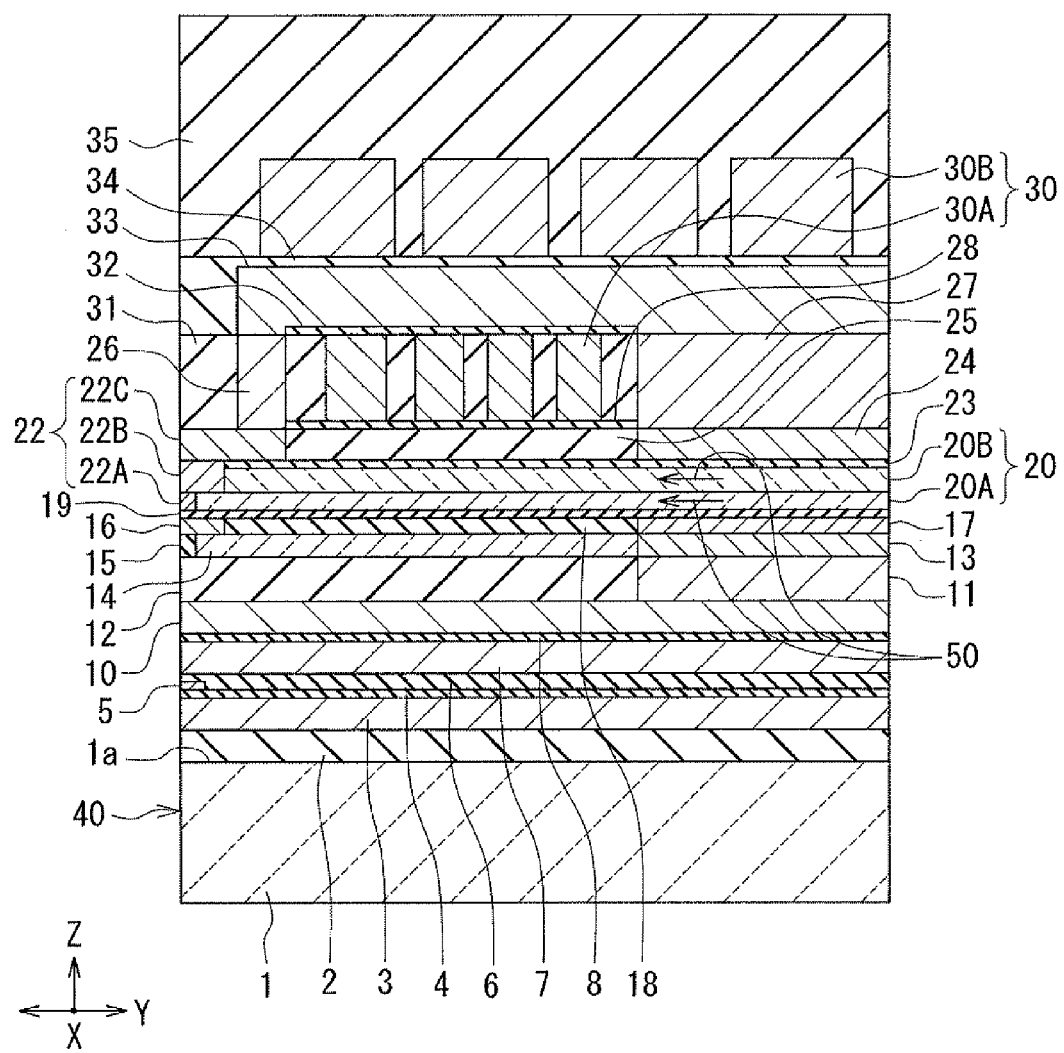
FIG. 4 is a cross-sectional view showing the configuration of the heat-assisted magnetic recording head according to the first embodiment of the invention.
Figure 5:
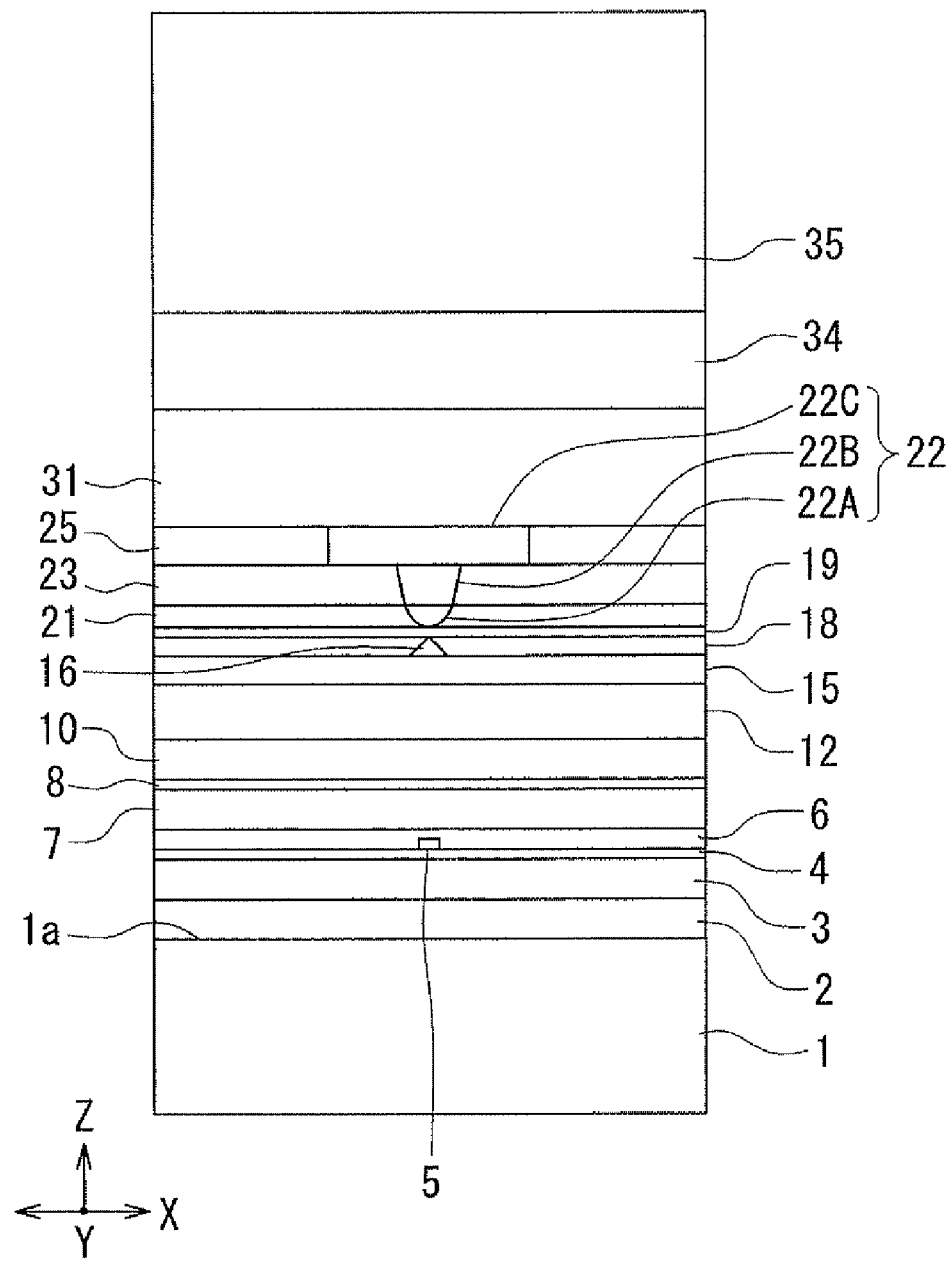
FIG. 5 is a front view showing the medium facing surface of the heat-assisted magnetic recording head according to the first embodiment of the invention.
Figure 6:
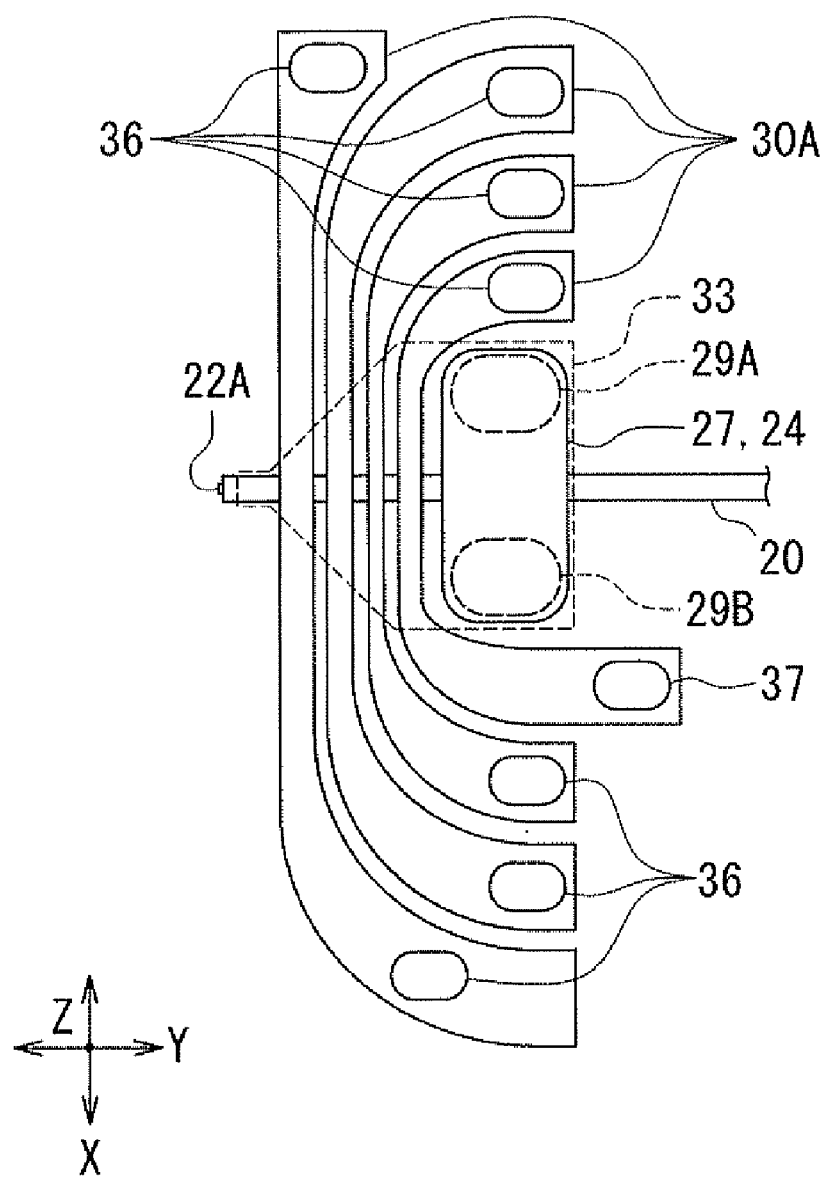
FIG. 6 is a plan view showing a first layer of a coil of the heat-assisted magnetic recording head according to the first embodiment of the invention.
Figure 7:
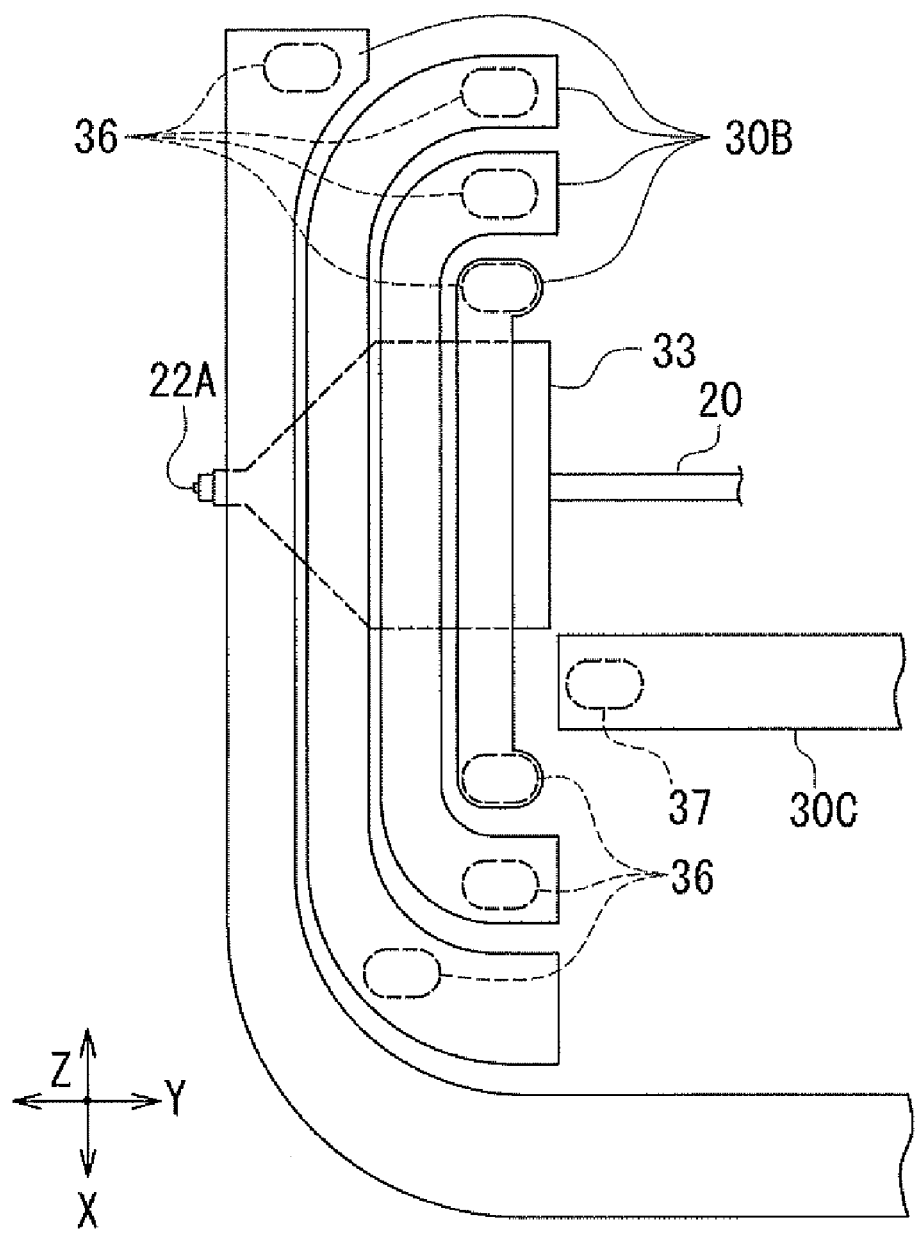
FIG. 7 is a plan view showing a second layer of the coil of the heat-assisted magnetic recording head according to the first embodiment of the invention.

Preferred embodiments of the present invention will now be described in detail with reference to the drawings. First, reference is made to FIG. 3 to FIG. 7 to describe the configuration of a heat-assisted magnetic recording head according to a first embodiment of the invention. FIG. 3 is a perspective view showing the main part of the heat-assisted magnetic recording head. FIG. 4 is a cross-sectional view showing the configuration of the heat-assisted magnetic recording head. FIG. 5 is a front view showing the medium facing surface of the heat-assisted magnetic recording head. FIG. 6 is a plan view showing a first layer of a coil of the heat-assisted magnetic recording head. FIG. 7 is a plan view showing a second layer of the coil of the heat-assisted magnetic recording head.

The heat-assisted magnetic recording head according to the present embodiment is for use in perpendicular magnetic recording, and is in the form of a slider that flies over the surface of a recording medium that is driven to rotate. When the recording medium rotates, an airflow passing between the recording medium and the slider causes a lift to be exerted on the slider. The slider is configured to fly over the surface of the recording medium by means of the lift.

As shown in FIG. 4, the heat-assisted magnetic recording head has a medium facing surface 40 that faces the recording medium. Here, X direction, Y direction, and Z direction will be defined as follows. The X direction is the direction across the tracks of the recording medium, i.e., the track width direction. The Y direction is a direction perpendicular to the medium facing surface 40. The Z direction is the direction of travel of the recording medium as viewed from the slider. The X, Y, and Z directions are orthogonal to one another.

As shown in FIG. 4 and FIG. 5, the heat-assisted magnetic recording head includes: a substrate 1 made of a ceramic material such as aluminum oxide-titanium carbide ($Al_2O_3$—TiC) and having a top surface 1a; an insulating layer 2 made of an insulating material and disposed on the top surface 1a of the substrate 1; and a bottom shield layer 3 made of a magnetic material and disposed on the insulating layer 2. The insulating layer 2 is made of alumina ($Al_2O_3$), for example.

The heat-assisted magnetic recording head further includes: a bottom shield gap film 4 which is an insulating film disposed on the top surface of the bottom shield layer 3; a magnetoresistive (MR) element 5 as a read element disposed on the bottom shield gap film 4; two leads (not shown) connected to the MR element 5; a top shield gap film 6 which is an insulating film disposed on the MR element 5; and a top shield layer 7 made of a magnetic material and disposed on the top shield gap film 6.

An end of the MR element 5 is located in the medium facing surface 40 that faces the recording medium. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction nearly parallel to the plane of layers constituting the GMR element or the current-perpendicular-to-plane (CPP) type in which the current used for detecting magnetic signals is fed in a direction nearly perpendicular to the plane of layers constituting the GMR element. If the MR element 5 is a TMR element or a CPP-type GMR element, the bottom shield layer 3 and the top shield layer 7 may also function as the two leads, with the top surface of the bottom shield layer 3 in contact with the bottom surface of the MR element 5 and the bottom surface of the top shield layer 7 in contact with the top surface of the MR element 5. The parts from the bottom shield layer 3 to the top shield layer 7 constitute a read head.

The heat-assisted magnetic recording head further includes: a nonmagnetic layer 8 made of a nonmagnetic material and disposed on the top surface of the top shield layer 7; and a return magnetic pole layer 10 made of a magnetic material and disposed on the nonmagnetic layer 8. The nonmagnetic layer 8 is made of alumina, for example.

The heat-assisted magnetic recording head further includes: a coupling layer 11 made of a magnetic material and disposed on a part of the top surface of the return magnetic pole layer 10 away from the medium facing surface 40; and an insulating layer 12 disposed around the coupling layer 11 on the top surface of the return magnetic pole layer 10. The insulating layer 12 is made of alumina, for example.

The heat-assisted magnetic recording head further includes: a coupling layer 13 made of a magnetic material and disposed on the coupling layer 11; a heat sink layer 14 disposed on a part of the top surface of the insulating layer 12; and an insulating layer 15 disposed around the coupling layer 13 and the heat sink layer 14 on the top surface of the insulating layer 12. An end face of the heat sink layer 14 closer to the medium facing surface 40 is located at a distance from the medium facing surface 40. A part of the insulating layer 15 is interposed between the end face of the heat sink layer 14 and the medium facing surface 40. The heat sink layer 14 is made of a material having a high thermal conductivity, such as SiC. The insulating layer 15 is made of alumina, for example. The coupling layer 13, the heat sink layer 14, and the insulating layer 15 are flattened at the top.

The heat-assisted magnetic recording head further includes: a near-field light generating element 16 disposed on top of the heat sink layer 14 and the insulating layer 15 in the vicinity of the medium facing surface 40; a coupling layer 17 made of a magnetic material and disposed on the coupling layer 13; and a surrounding layer 18 disposed on top of the heat sink layer 14 and the insulating layer 15 and surrounding the near-field light generating element 16 and the coupling layer 17. The surrounding layer 18 may thinly cover the near-field light generating element 16. The near-field light generating element 16 is made of a metal. Specifically, the near-field light generating element 16 is made of one of Au, Ag, Al, Cu, Pd, Pt, Rh and Ir, or of an alloy composed of two or more of these elements. At least part of the surrounding layer 18 is made of a non-metallic inorganic material. The coupling layer 17 and the surrounding layer 18 are flattened at the top.

The heat-assisted magnetic recording head further includes: a clad layer 19 disposed over the top surfaces of the coupling layer 17 and the surrounding layer 18; and a waveguide 20 and a magnetic pole 20 that are disposed on the clad layer 19. The waveguide 20 is made of a dielectric material that transmits laser light to be used for generating near-field light. The laser light emitted from a not-shown laser diode enters the waveguide 20 and is propagated through the waveguide 20. The clad layer 19 is made of a dielectric material that has a refractive index lower than that of the waveguide 20. For example, the waveguide 20 can be made of $Ta_2O_5$ which has a refractive index of approximately 2.1, and the clad layer 19 can be made of alumina which has a refractive index of approximately 1.8.

The waveguide 20 includes a first layer 20A lying on the clad layer 19 and a second layer 20B lying on the first layer 20A. The magnetic pole 22 includes a first layer 22A lying on the clad layer 19, a second layer 22B lying on the first layer 22A, and a third layer 22C lying on the second layer 22B.

The heat-assisted magnetic recording head further includes clad layers 21 and 23. The clad layer 21 is disposed around the first layer 20A of the waveguide 20 and the first layer 22A of the magnetic pole 22 on the clad layer 19. The clad layer 23 is disposed around the second layer 20B of the waveguide 20 and the second layer 22B of the magnetic pole 22 on the clad layer 21. A part of the clad layer 23 covers the top surface of the second layer 20B. The clad layers 21 and 23 are each made of a dielectric material that has a refractive index lower than that of the waveguide 20. If the waveguide 20 is made of $Ta_2O_5$, the clad layers 21 and 23 can be made of alumina, for example.

The heat-assisted magnetic recording head further includes: a coupling layer 24 made of a magnetic material and disposed on a part of the clad layer 23 above the coupling layer 17; and an insulating layer 25 disposed around the third layer 22C of the magnetic pole 22 and the coupling layer 24 on the clad layer 23. The insulating layer 25 is made of alumina, for example. The coupling layer 24 is magnetically coupled to the coupling layer 17 via two coupling portions to be described later.

The heat-assisted magnetic recording head further includes: a coupling layer 26 made of a magnetic material and disposed on the third layer 22C of the magnetic pole 22; and a coupling layer 27 made of a magnetic material and disposed on the coupling layer 24.

The heat-assisted magnetic recording head further includes: an insulating layer 28 disposed on the insulating layer 25; a plurality of first coil elements 30A disposed on the insulating layer 28; and an insulating layer 31 disposed around the coupling layers 26 and 27 and the first coil elements 30A. FIG. 6 shows the first coil elements 30A. The first coil elements 30A are arranged to align in the Y direction. Each first coil element 30A has a main part that extends in the track width direction (the X direction). Each first coil element 30A is made of a conductive material such as copper. The insulating layers 28 and 31 are made of alumina, for example.

The heat-assisted magnetic recording head further includes: an insulating layer 32 disposed to cover the first coil elements 30A; and a yoke layer 33 made of a magnetic material and disposed over the coupling layers 26 and 27 and the insulating layer 32. The yoke layer 33 magnetically couples the coupling layer 26 to the coupling layer 27. The insulating layer 32 is made of alumina, for example.

The heat-assisted magnetic recording head further includes: an insulating layer 34 disposed to cover the yoke layer 33; a plurality of second coil elements 30B disposed on the insulating layer 34; a lead layer 30C disposed on the insulating layer 34; and a protection layer 35 disposed to cover the second coil elements 30B and the lead layer 30C. The insulating layer 34 and the protection layer 35 are made of alumina, for example.

FIG. 7 shows the second coil elements 30B and the lead layer 30C. The second coil elements 30B are arranged to align in the Y direction. Each second coil element 30B has a main part that extends in the track width direction (the X direction). Each second coil element 30B and the lead layer 30C are made of a conductive material such as copper.

As shown in FIG. 6 and FIG. 7, the heat-assisted magnetic recording head further includes a plurality of connecting portions 36 and a connecting portion 37. The plurality of connecting portions 36 connect the plurality of first coil elements 30A to the plurality of second coil elements 30B so as to form a coil 30 wound around the yoke layer 33 helically. The connecting portion 37 connects one of the first coil elements 30A to the lead layer 30C. The connecting portions 36 and the connecting portion 37 are provided to penetrate through the insulating layer 34. The connecting portions 36 and the connecting portion 37 are each made of a conductive material such as copper.

FIG. 6 further shows two coupling portions 29A and 29B that couple the coupling layer 24 to the coupling layer 17. The coupling portions 29A and 29B are provided to penetrate through the clad layers 19, 21, and 23. The coupling portions 29A and 29B are disposed on opposite sides of the waveguide 20 in the track width direction (the X direction), each being spaced from the waveguide 20. Although not shown, each of the coupling portions 29A and 29B includes a first layer lying on the coupling layer 17 and a second layer lying on the first layer.

The parts from the return magnetic pole layer 10 to the second coil elements 30B constitute a write head. The coil 30, which is composed of the first coil elements 30A, the second coil elements 30B and the connecting portions 36, produces a magnetic field corresponding to data to be written on the recording medium. The return magnetic pole layer 10, the coupling layers 11, 13 and 17, the coupling portions 29A and 29B, the coupling layers 24 and 27, the yoke layer 33, the coupling layer 26, and the magnetic pole 22 form a magnetic path for passing a magnetic flux corresponding to the magnetic field produced by the coil 30. The magnetic pole 22 allows the magnetic flux corresponding to the magnetic field produced by the coil 30 to pass, and produces a write magnetic field for writing data on the recording medium by means of a perpendicular magnetic recording system.

As has been described, the heat-assisted magnetic recording head according to the present embodiment includes the medium facing surface 40 that faces the recording medium, the read head, and the write head. The read head and the write head are stacked on the substrate 1. Relative to the read head, the write head is located on the front side (trailing side) in the direction of travel of the recording medium (the Z direction).

The read head includes: the MR element 5 as the read element; the bottom shield layer 3 and the top shield layer 7 for shielding the MR element 5, the bottom shield layer 3 and the top shield layer 7 having their respective portions that are located near the medium facing surface 40 and are opposed to each other with the MR element 5 therebetween; the bottom shield gap film 4 disposed between the MR element 5 and the bottom shield layer 3; and the top shield gap film 6 disposed between the MR element 5 and the top shield layer 7.

The write head includes the near-field light generating element 16, the magnetic pole 22, the waveguide 20, and the coil 30 that are disposed above the top surface 1a of the substrate 1. The coil 30 produces a magnetic field corresponding to data to be written on the recording medium. The magnetic pole 22 allows the magnetic flux corresponding to the magnetic field produced by the coil 30 to pass, and produces a write magnetic field for writing data on the recording medium by means of the perpendicular magnetic recording system. The waveguide 20 propagates the laser light emitted from the not-shown laser diode.

Figure 1:
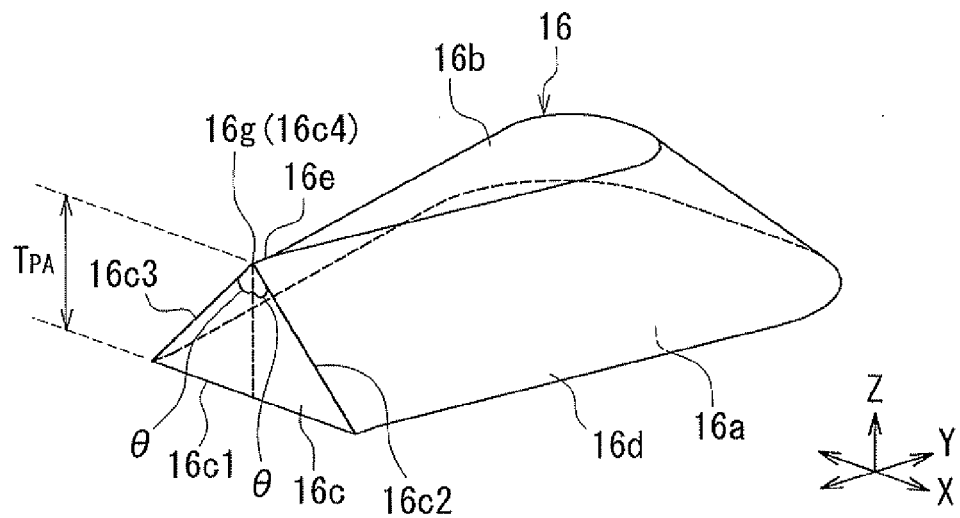
FIG. 1 is perspective view showing a near-field light generating element according to a first embodiment of the invention.
Figure 2:
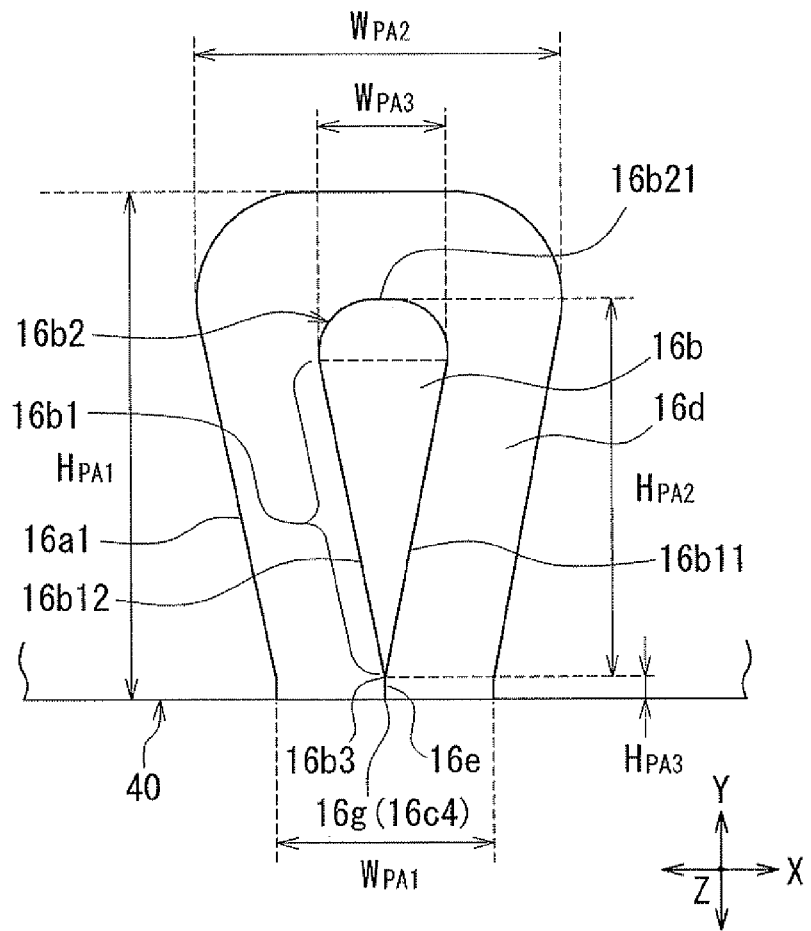
FIG. 2 is a plan view of the near-field light generating element shown in FIG. 1.

A description will now be given of the near-field light generating element 16 with reference to FIG. 1 and FIG. 2. FIG. 1 is a perspective view of the near-field light generating element 16. FIG. 2 is a plan view of the near-field light generating element 16 shown in FIG. 1. As shown in FIG. 1 and FIG. 2, the near-field light generating element 16 has a near-field light generating part 16g located in the medium facing surface 40. The near-field light generating element 16 has an outer surface as described below. The outer surface of the near-field light generating element 16 includes: a bottom surface 16a that lies at an end closer to the top surface 1a of the substrate 1; a waveguide facing surface 16b that lies at an end farther from the top surface 1a of the substrate 1 and faces the waveguide 20; a front end face 16c located in the medium facing surface 40; and a side surface 16d that connects the bottom surface 16a, the waveguide facing surface 16b, and the front end face 16c to each other.

The front end face 16c includes: a first side 16c1 that lies at an end of the bottom surface 16a; a tip 16c4 that lies at an end farther from the top surface 1a of the substrate 1 and forms the near-field light generating part 16g; a second side 16c2 that connects an end of the first side 16c1 to the tip 16c4; and a third side 16c3 that connects the other end of the first side 16c1 to the tip 16c4. The near-field light generating part 16g refers to the tip 16c4 and its vicinity in the front end face 16c. As shown in FIG. 3, the end face of the magnetic pole 22 located in the medium facing surface 40 is disposed at such a position that the tip 16c4 lies between the end face of the magnetic pole 22 and the first side 16c1 of the front end face 16c of the near-field light generating element 16.

As shown in FIG. 2, the waveguide facing surface 16b includes a width changing portion 16b1 and a rear portion 16b2. The width changing portion 16b1 has a width in a direction parallel to the bottom surface 16a and the front end face 16c (the X direction), the width decreasing with decreasing distance to the front end face 16c. The rear portion 16b2 is located farther from the medium facing surface 40 than is the width changing portion 16b1, such that the rear portion 16b2 is continuous with the width changing portion 16b1. The width changing portion 16b1 has two sides 16b11 and 16b12 that lie on opposite sides in the direction parallel to the bottom surface 16a and the front end face 16c (the X direction). The distance between the two sides 16b11 and 16b12 in the direction parallel to the bottom surface 16a and the front end face 16c (the X direction) decreases with decreasing distance to the front end face 16c. The rear portion 16b2 has an outer edge 16b21 of arc shape that connects respective ends of the two sides 16b11 and 16b12 to each other, the ends being farther from the medium facing surface 40.

The waveguide facing surface 16b has a front end part 16b3 that is closer to the front end face 16c. The two sides 16b11 and 16b12 meet at the front end part 16b3. The front end part 16b3 is located away from the front end face 16c. The outer surface of the near-field light generating element 16 further includes an edge part 16e that connects the front end part 16b3 to the tip 16c4 of the front end face 16c. Alternatively, the outer surface of the near-field light generating element 16 may be without the edge part 16e, so that the front end part 16b3 may be located in the medium facing surface 40.

As shown in FIG. 2, the bottom surface 16a has an outer edge 16a1. When seen from above, the outer edge of the waveguide facing surface 16b including the two sides 16b11 and 16b12 and the outer edge 16b21 lies inside the outer edge 16a1 of the bottom surface 16a. The cross section of the near-field light generating element 16 parallel to the bottom surface 16a decreases in size with increasing distance from the bottom surface 16a.

Here, as shown in FIG. 2, the length of the near-field light generating element 16, the length of the waveguide facing surface 16b, and the length of the edge part 16e in the direction perpendicular to the medium facing surface 40 (the Y direction) will be denoted by the symbols $H_{PA1}$, $H_{PA2}$ and $H_{PA3}$, respectively. The maximum width of the front end face 16c (the length of the first side 16c1), the maximum width of the bottom surface 16a, and the maximum width of the waveguide facing surface 16b in the X direction will be denoted by the symbols $W_{PA1}$, $W_{PA2}$, and $W_{PA3}$, respectively. As shown in FIG. 1, the length of the front end face 16c in the direction perpendicular to the bottom surface 16a (the Z direction) will be denoted by the symbol $T_{PA}$. $H_{PA1}$ is greater than $T_{PA}$. Both of $W_{PA1}$ and $T_{PA}$ are smaller than or equal to the wavelength of light that is propagated through the waveguide 20. $H_{PA1}$ falls within the range of 0.6 to 2.5 µm, for example. $H_{PA2}$ falls within the range of 0.35 to 2.35 µm, for example. $H_{PA3}$ falls within the range of 0 to 1.0 µm, for example. $W_{PA1}$ falls within the range of 100 to 500 nm, for example. $W_{PA2}$ falls within the range of 500 to 1500 nm, for example. $W_{PA3}$ falls within the range of 350 to 1350 nm, for example. $T_{PA}$ falls within the range of 100 to 500 nm, for example.

In the front end face 16c, the angle that the second side 16c2 forms with respect to the direction perpendicular to the first side 16c1 (the Z direction) is equal to the angle that the third side 16c3 forms with respect to the direction perpendicular to the first side 16c1 (the Z direction). Hereinafter, this angle will be represented by θ. The angle θ falls within the range of 30 to 60 degrees, for example.

As shown in FIG. 3, the magnetic pole 22 has a bottom end (the bottom end of the first layer 22A) that is opposed to the edge part 16e with a predetermined distance therebetween. The waveguide 20 has a bottom surface (the bottom surface of the first layer 20A) that is opposed to the waveguide facing surface 16b with a predetermined distance therebetween. At least the clad layer 19 is interposed between the edge part 16e and the bottom end of the magnetic pole 22 and between the waveguide facing surface 16b and the bottom surface of the waveguide 20. In addition to the clad layer 19, the surrounding layer 18 may also be interposed between the edge part 16e and the bottom end of the magnetic pole 22. The distance between the edge part 16e and the bottom end of the magnetic pole 22 falls within the range of 5 to 80 nm, for example. The distance between the waveguide facing surface 16b and the bottom surface of the waveguide 20 falls within the range of 5 to 80 nm, for example.

Now, the principle of generation of near-field light in the present embodiment and the principle of heat-assisted magnetic recording using the near-field light will be described in detail. The laser light emitted from the not-shown laser diode enters the waveguide 20. As shown in FIG. 4, the laser light 50 is propagated through the waveguide 20 toward the medium facing surface 40, and reaches the vicinity of the near-field light generating element 16. The laser light 50 is then totally reflected at the bottom surface of the waveguide 20. This generates evanescent light permeating into the clad layer 19. As a result, the evanescent light and the collective oscillations of charges on the waveguide facing surface 16b of the near-field light generating element 16, i.e., surface plasmons, are coupled with each other to excite a system of surface plasmon polaritons. In this way, surface plasmons are excited on the waveguide facing surface 16b of the near-field light generating element 16.

The surface plasmons excited on the waveguide facing surface 16b are propagated through the waveguide facing surface 16b to reach the edge part 16e, and are further propagated through the edge part 16e to reach the near-field light generating part 16g. Consequently, the surface plasmons concentrate at the near-field light generating part 16g, and the near-field light generating part 16g generates near-field light based on the surface plasmons. The near-field light is projected toward the recording medium, reaches the surface of the recording medium and heats a part of the magnetic recording layer of the recording medium. This lowers the coercivity of the part of the magnetic recording layer. In heat-assisted magnetic recording, the part of the magnetic recording layer with the lowered coercivity is subjected to a write magnetic field produced by the magnetic pole 22 for performing data writing.

In the present embodiment, the surface plasmons resulting from the evanescent light are excited on the waveguide facing surface 16b in the near-field light generating element 16. As compared with a case of using a near-field light generating element that is configured to excite surface plasmons on the edge part, the present embodiment thus allows more surface plasmons to be excited on the waveguide facing surface 16b. The waveguide facing surface 16b has the width changing portion 16b1 that decreases in width with decreasing distance to the front end face 16c. The front end part 16b3 of the waveguide facing surface 16b is connected via the edge part 16e to the tip 16c4 of the front end face 16c that forms the near-field light generating part 16g. Consequently, according to the present embodiment, the surface plasmons excited on the waveguide facing surface 16b can be concentrated at the near-field light generating part 16g. The present embodiment thereby makes it possible to generate near-field light that has a small spot diameter and sufficient intensity.

Now, with reference to FIG. 4 and FIG. 5, a description will be given of a method of manufacturing the heat-assisted magnetic recording head according to the present embodiment. The method of manufacturing the heat-assisted magnetic recording head according to the present embodiment includes the steps of forming components of a plurality of heat-assisted magnetic recording heads other than the substrates 1 on a substrate that includes portions to become the substrates 1 of the plurality of heat-assisted magnetic recording heads, thereby fabricating a substructure that includes pre-head portions arranged in a plurality of rows, the pre-head portions being intended to become the heat-assisted magnetic recording heads later; and forming the plurality of heat-assisted magnetic recording heads by cutting the substructure to separate the plurality of pre-head portions from each other. In the step of forming the plurality of heat-assisted magnetic recording heads, the surfaces formed by cutting are polished into the medium facing surfaces 40.

The method of manufacturing the heat-assisted magnetic recording head according to the present embodiment will now be described in more detail with attention focused on a single heat-assisted magnetic recording head. In the method of manufacturing the heat-assisted magnetic recording head according to the present embodiment, the insulating layer 2 is initially formed on the substrate 1. Next, the bottom shield layer 3 is formed on the insulating layer 2. Next, the bottom shield gap film 4 is formed on the bottom shield layer 3. Next, the MR element 5 and the not-shown two leads connected to the MR element 5 are formed on the bottom shield gap film 4. Next, the top shield gap film 6 is formed to cover the MR element 5 and the leads. Next, the top shield layer 7 is formed on the top shield gap film 6. Next, the nonmagnetic layer 8 is formed on the top shield layer 7. Next, the return magnetic pole layer 10 is formed on the nonmagnetic layer 8.

Next, the coupling layer 11 is formed on the return magnetic pole layer 10. Next, the insulating layer 12 is formed to cover the coupling layer 11. The insulating layer 12 is then polished by, for example, chemical mechanical polishing (hereinafter referred to as CMP), until the coupling layer 11 is exposed. This flattens the coupling layer 11 and the insulating layer 12 at the top. Next, the coupling layer 13 is formed on the coupling layer 11, and the heat sink layer 14 is formed on the insulating layer 12. Next, the insulating layer 15 is formed to cover the coupling layer 13 and the heat sink layer 14. The insulating layer 15 is then polished by, for example, CMP, until the coupling layer 13 and the heat sink layer 14 are exposed. This flattens the coupling layer 13, the heat sink layer 14, and the insulating layer 15 at the top.

Next, the coupling layer 17 is formed on the coupling layer 13, and the near-field light generating element 16 and the surrounding layer 18 are formed on top of the heat sink layer 14 and the insulating layer 15. The step of forming the near-field light generating element 16 and the surrounding layer 18 will be described in detail later.

Next, the clad layer 19 is formed over the coupling layer 17 and the surrounding layer 18. The clad layer 19 has two openings that are located above the coupling layer 17. The two openings are intended for passing the coupling portions 29A and 29B therethrough. Next, the respective first layers of the coupling portions 29A and 29B are formed to be coupled to the coupling layer 17 through the two openings. The first layer 20A of the waveguide 20, the first layer 22A of the magnetic pole 22, and the clad layer 21 are formed on the clad layer 19.

Next, the second layer 20B of the waveguide 20 is formed on the first layer 20A, and the second layer 22B of the magnetic pole 22 is formed on the first layer 22A. The respective second layers of the coupling portions 29A and 29B are formed on the respective first layers of the coupling portions 29A and 29B. Next, the clad layer 23 is formed to cover the second layer 20B, the second layer 22B, and the respective second layers of the coupling portions 29A and 29B. Next, the clad layer 23 is polished by, for example, CMP, until the second layer 22B and the respective second layers of the coupling portions 29A and 29B are exposed.

Next, the third layer 22C of the magnetic pole 22 is formed on the second layer 22B, and the coupling layer 24 is formed to be coupled to the coupling portions 29A and 29B. Next, the insulating layer 25 is formed to cover the third layer 22C and the coupling layer 24. The insulating layer 25 is then polished by, for example CMP, until the third layer 22C and the coupling layer 24 are exposed.

Next, the insulating layer 28 is formed on the insulating layer 25. Next, the first coil elements 30A are formed on the insulating layer 28. The coupling layer 26 is formed on the third layer 22C of the magnetic pole 22, and the coupling layer 27 is formed on the coupling layer 24. Next, the insulating layer 31 is formed to cover the first coil elements 30A and the coupling layers 26 and 27. The insulating layer 31 is then polished by, for example, CMP, until the first coil elements 30A and the coupling layers 26 and 27 are exposed.

Next, the insulating layer 32 is formed to cover the first coil elements 30A. The insulating layer 32 has a plurality of openings for passing the connecting portions 36 and 37 therethrough. Next, the connecting portions 36 and 37 are formed to be connected to the first coil elements 30A through the plurality of openings. Next, the yoke layer 33 is formed over the coupling layers 26 and 27 and the insulating layer 32. Next, the insulating layer 34 is formed to cover the yoke layer 33 and the connecting portions 36 and 37. The insulating layer 34 is then polished by, for example, CMP, until the connecting portions 36 and 37 are exposed.

Next, the second coil elements 30B and the lead layer 30C are formed on the connecting portions 36 and 37 and the insulating layer 34. Next, the protection layer 35 is formed to cover the second coil elements 30B and the lead layer 30C. Wiring, terminals, and other components are then formed on the top surface of the protection layer 35.

When the substructure is completed thus, the substructure is cut to separate the plurality of pre-head portions from each other, followed by the polishing of the medium facing surface 40 and the fabrication of flying rails etc. This completes the heat-assisted magnetic recording head.

The step of forming the near-field light generating element 16 and the surrounding layer 18 will now be described in detail with reference to FIG. 8A to FIG. 19C. The step of forming the near-field light generating element 16 and the surrounding layer 18 includes forming the near-field light generating element 16. The following description includes the description of the method of manufacturing the near-field light generating element 16 according to the present embodiment.

FIG. 8A to FIG. 19C each show a stack of layers in the process of forming the near-field light generating element 16 and the surrounding layer 18. The portions lying below the heat sink layer 14 and the insulating layer 15 are omitted in FIG. 8A to FIG. 19C. Of FIG. 8A to FIG. 19C, FIG. nA (n is any integer between 8 and 19 inclusive) is a plan view of the stack. FIG. nB is a cross-sectional view showing a cross section of the stack taken at the position shown by the line nB-nB of FIG. nA. FIG. nC is a cross-sectional view showing a cross section of the stack taken at the position shown by the line nC-nC of FIG. nA. The position shown by the line nC-nC is the position where the medium facing surface 40 is to be formed.

Figure 8A:
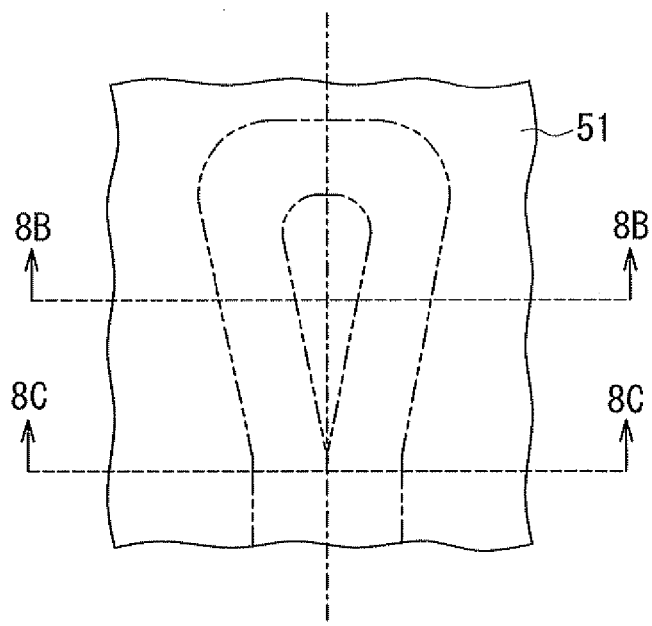
FIG. 8A to FIG. 8C are explanatory diagrams showing a step of a method of manufacturing the heat-assisted magnetic recording head according to the first embodiment of the invention.
Figure 8B:
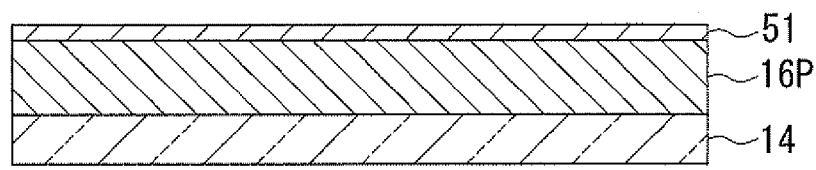
Figure 8C:
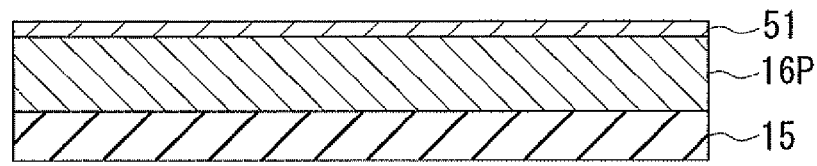

FIG. 8A to FIG. 8C show a step after the formation of the heat sink layer 14 and the insulating layer 15. In this step, a metal layer 16P is initially formed over the heat sink layer 14 and the insulating layer 15 by sputtering, for example. The metal layer 16P is to be etched later to become the near-field light generating element 16. In FIG. 8A, the shape of the near-field light generating element 16 to be formed later is shown by a chain double-dashed line. This also applies to other drawings. The metal layer 16P has a thickness in the range of 100 to 500 nm, for example. Next, a polishing stopper layer 51 is formed on the metal layer 16P by sputtering, for example. The polishing stopper layer 51 is intended for use in a polishing step to be performed later. The polishing stopper layer 51 has a thickness in the range of 20 to 60 nm, for example. The polishing stopper layer 51 includes a layer of Ta or Ru, for example. The polishing stopper layer 51 may include a first layer of Ta or Ru, for example, and a second layer of NiCr, for example, which is formed on the first layer.

Figure 9A:
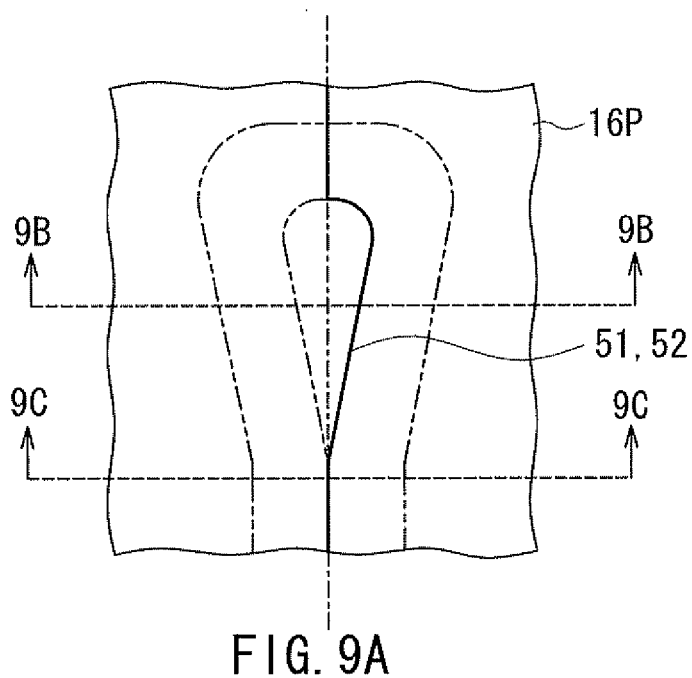
FIG. 9A to FIG. 9C are explanatory diagrams showing a step that follows the step shown in FIG. 8A to FIG. 8C.
Figure 9B:
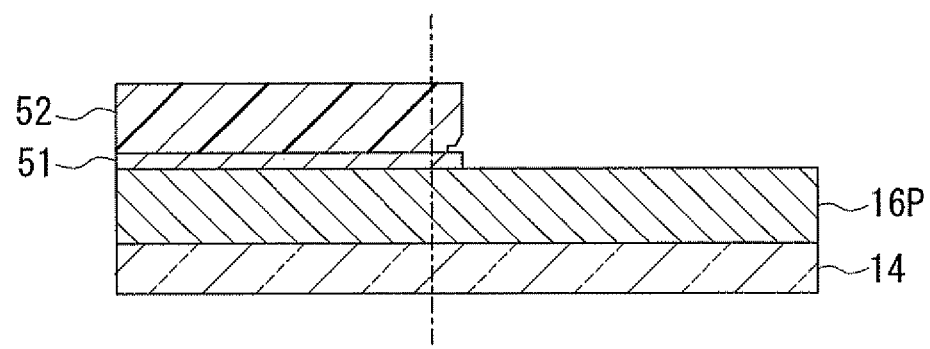
Figure 9C:
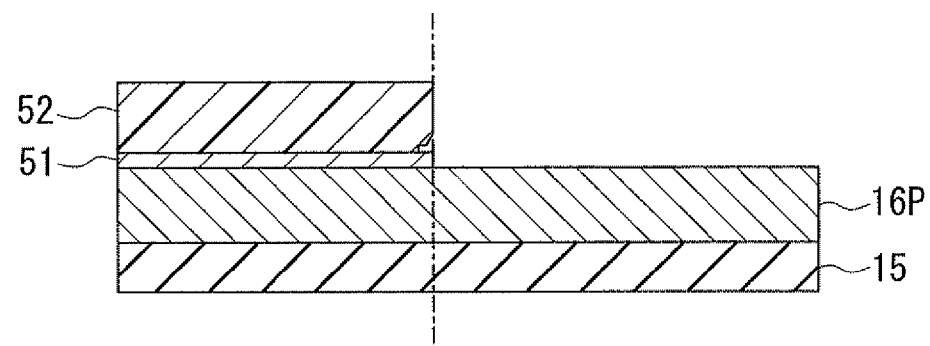

FIG. 9A to FIG. 9C show the next step. In this step, a photoresist mask 52 is initially formed on the polishing stopper layer 51. Next, the polishing stopper layer 51 is etched by, for example, ion beam etching (hereinafter referred to as IBE) or reactive ion etching (hereinafter referred to as RIE), by using the photoresist mask 52 as the etching mask. The polishing stopper layer 51 thus etched covers an area of the metal layer 16P where the waveguide facing surface 16b is to be formed later and an area of the metal layer 16P where a part of the side surface 16d continuous with the third side 16c3 of the front end face 16c is to be formed later.

Figure 10A:
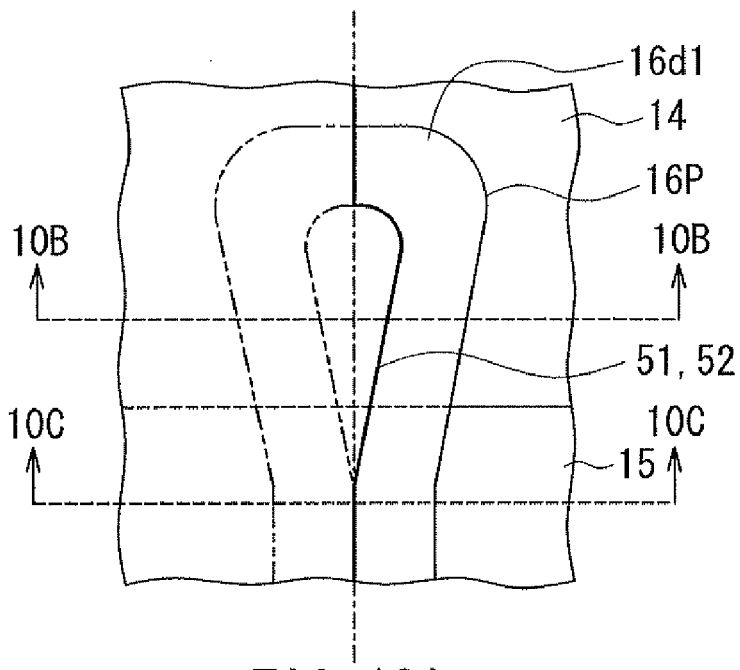
FIG. 10A to FIG. 10C are explanatory diagrams showing a step that follows the step shown in FIG. 9A to FIG. 9C.
Figure 10B:
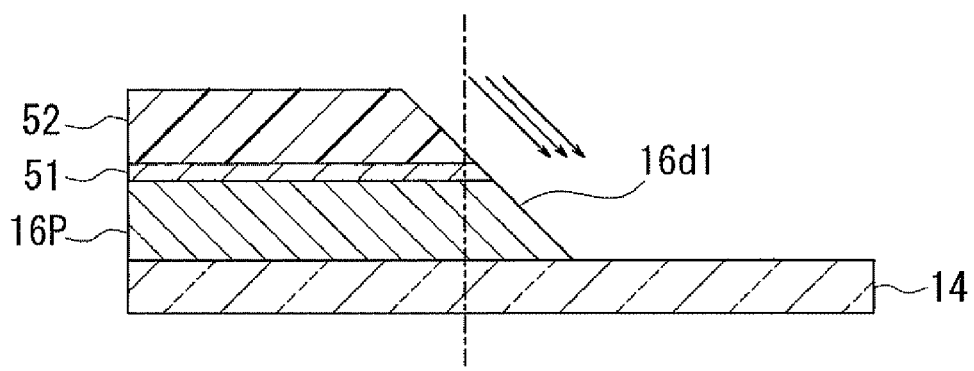
Figure 10C:
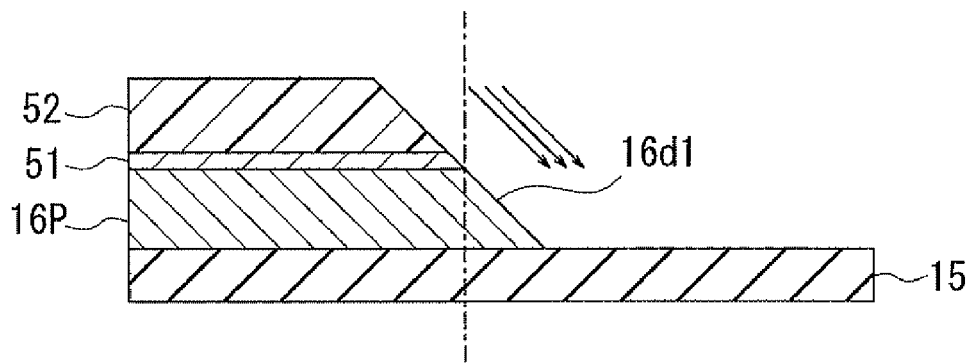

FIG. 10A to FIG. 10C show the next step. In this step, the polishing stopper layer 51 and the metal layer 16P are initially etched by, for example, IBE, by using the photoresist mask 52 as the etching mask. This step will be referred to as a first etching step. In the first etching step, the angle that the direction of travel of the ion beam forms with respect to the direction perpendicular to the bottom surface of the metal layer 16P is made equal to the angle θ that the second side 16c2 forms with respect to the direction perpendicular to the first side 16c1 (the Z direction) in the front end face 16c of the near-field light generating element 16. This provides the metal layer 16P with a part 16d1 of the side surface 16d continuous with the second side 16c2 of the front end face 16c. The photoresist mask 52 is then removed.

Figure 11A:
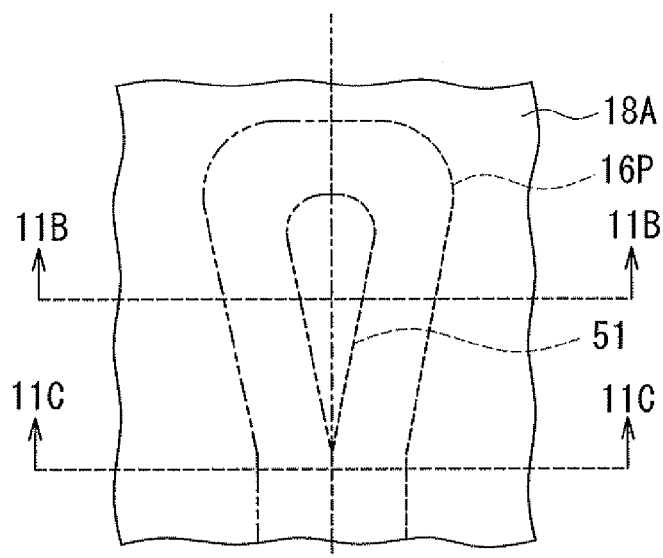
FIG. 11A to FIG. 11C are explanatory diagrams showing a step that follows the step shown in FIG. 10A to FIG. 10C.
Figure 11B:
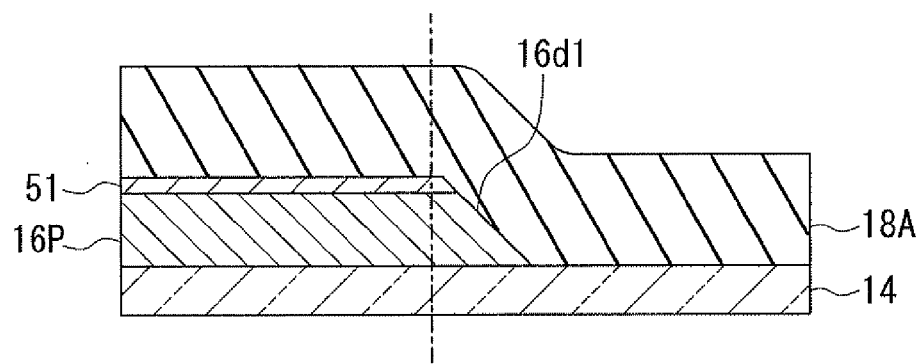
Figure 11C:
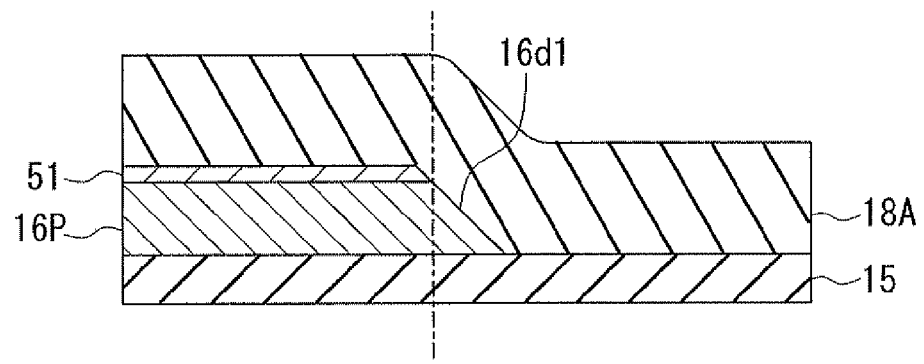

FIG. 11A to FIG. 11C show the next step. In this step, a coating layer 18A is formed to cover the polishing stopper layer 51 and the metal layer 16P provided with the part 16d1 of the side surface 16d. The coating layer 18A is formed also over the heat sink layer 14 and the insulating layer 15. The coating layer 18A is formed to have such a thickness that the top surface of the portion formed over the heat sink layer 14 and the insulating layer 15 lies at a level higher than the top surface of the polishing stopper layer 51. The thickness of the coating layer 18A falls within the range of 0.2 to 0.8 μm, for example. The coating layer 18A is made of a non-metallic inorganic material that has an etching rate lower than that of the metal layer 16P in a second etching step to be performed later. While the material of the coating layer 18A may be either an inorganic dielectric material or an inorganic semiconductor material, the former is preferred. The coating layer 18A may be made of one selected from the group consisting of $Al_2O_3$, $SiO_2$, $Ta_2O_5$, SiC, and TiN.

Figure 12A:
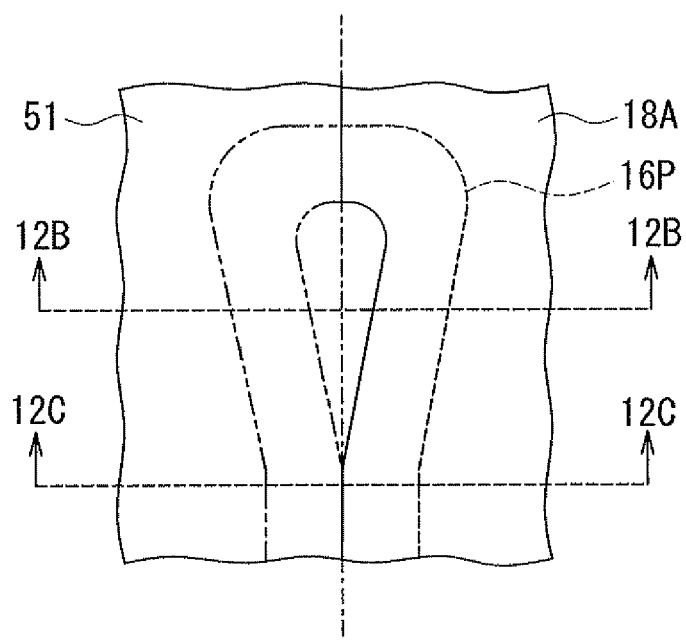
FIG. 12A to FIG. 12C are explanatory diagrams showing a step that follows the step shown in FIG. 11A to FIG. 11C.
Figure 12B:
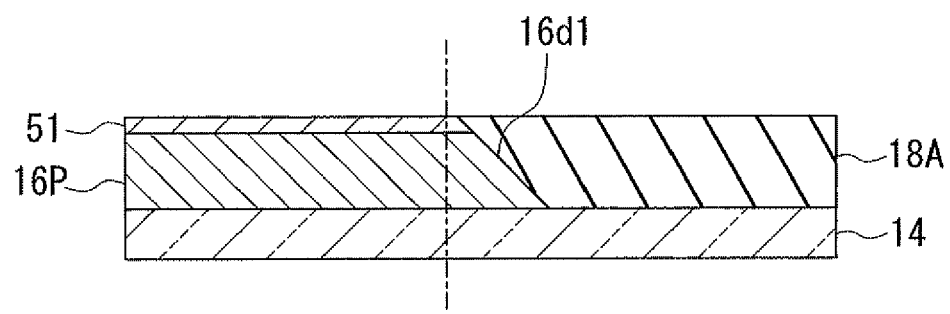
Figure 12C:
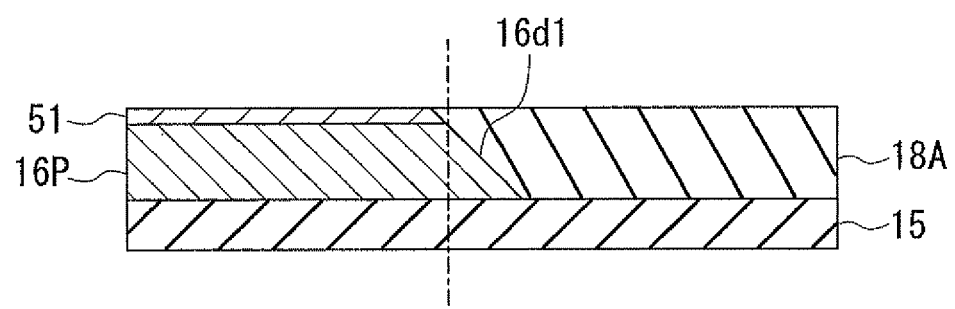

FIG. 12A to FIG. 12C show the next step. In this step, the coating layer 18A is polished by, for example, CMP, until the polishing stopper layer 51 is exposed. This step will be referred to as a polishing step.

Figure 13A:
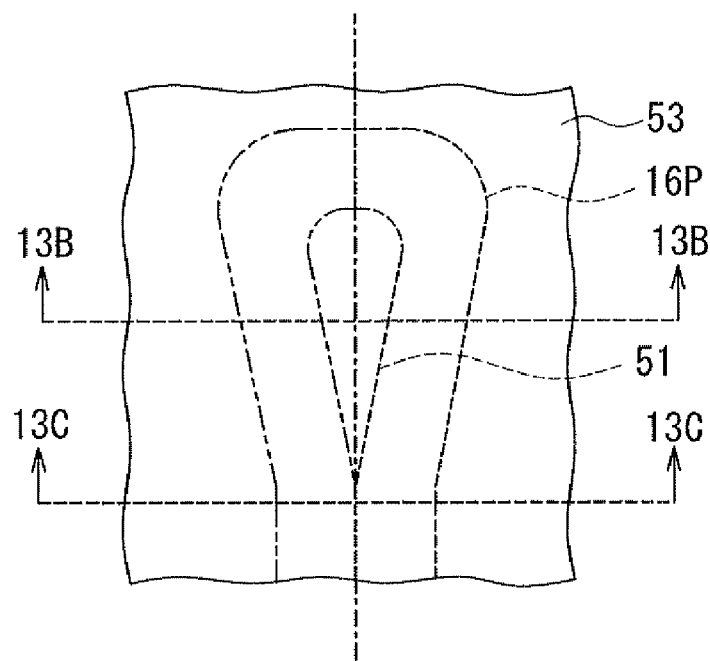
FIG. 13A to FIG. 13C are explanatory diagrams showing a step that follows the step shown in FIG. 12A to FIG. 12C.
Figure 13B:
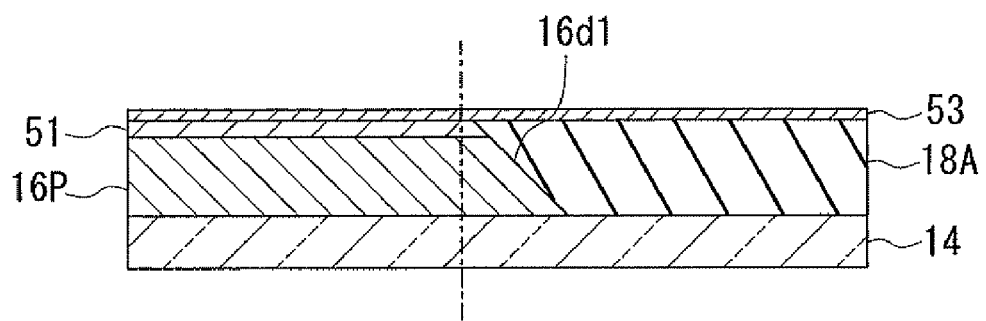
Figure 13C:
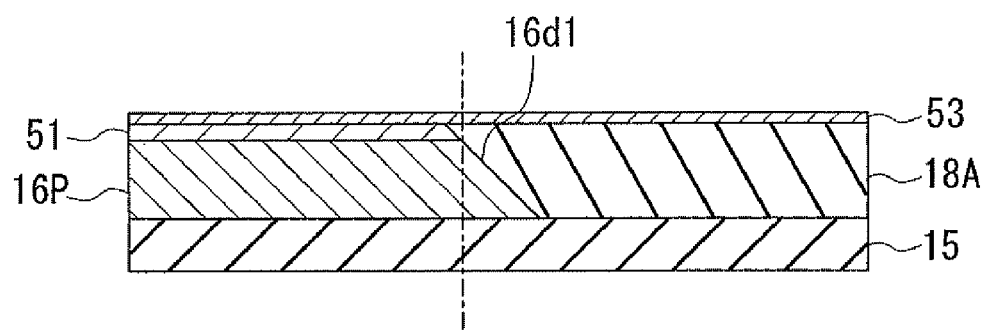

FIG. 13A to FIG. 13C show the next step. In this step, a second polishing stopper layer 53 is formed over the polishing stopper layer 51 and the coating layer 18A. The second polishing stopper layer 53 is intended for use in a second polishing step to be performed later. The thickness and material of the second polishing stopper layer 53 are the same as those of the polishing stopper layer 51.

Figure 14A:
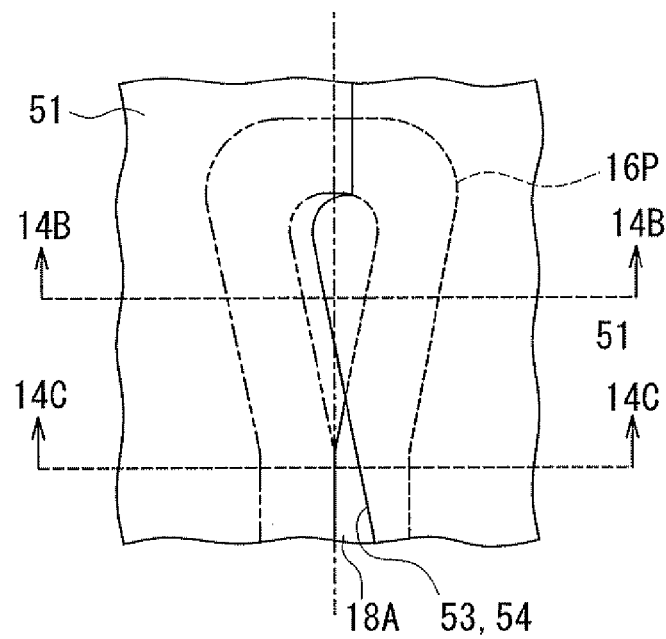
FIG. 14A to FIG. 14C are explanatory diagrams showing a step that follows the step shown in FIG. 13A to FIG. 13C.
Figure 14B:
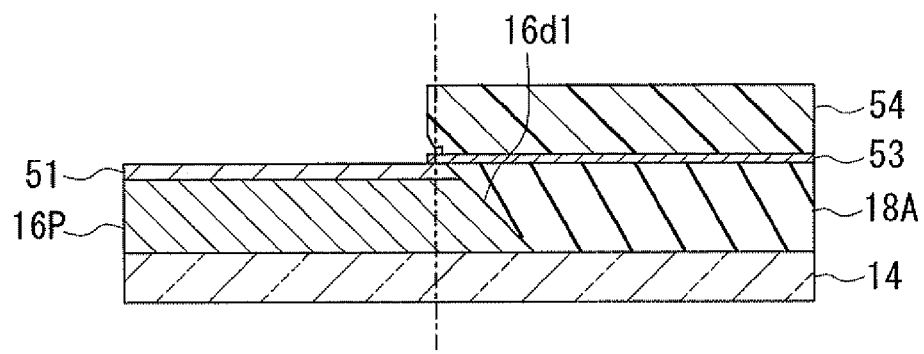
Figure 14C:
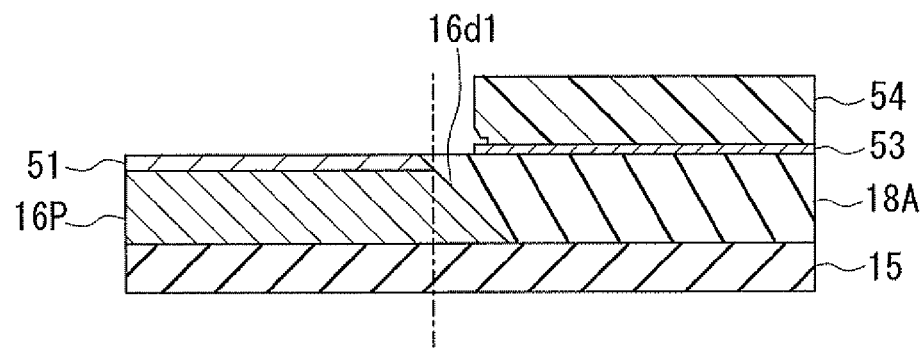

FIG. 14A to FIG. 14C show the next step. In this step, a photoresist mask 54 is initially formed on the second polishing stopper layer 53. Next, the second polishing stopper layer 53 is etched by, for example, IBE or RIE, by using the photoresist mask 54 as the etching mask. After the etching, the second polishing stopper layer 53 lies over the area of the metal layer 16P where the waveguide facing surface 16b is to be formed later and the part 16d1 of the side surface 16d previously formed. Note that as shown in FIG. 14A and FIG. 14C, the second polishing stop layer 53 does not cover a part of the coating layer 18A lying on the part 16d1 of the side surface 16d in the vicinity of the position where the medium facing surface 40 is to be formed.

Figure 15A:
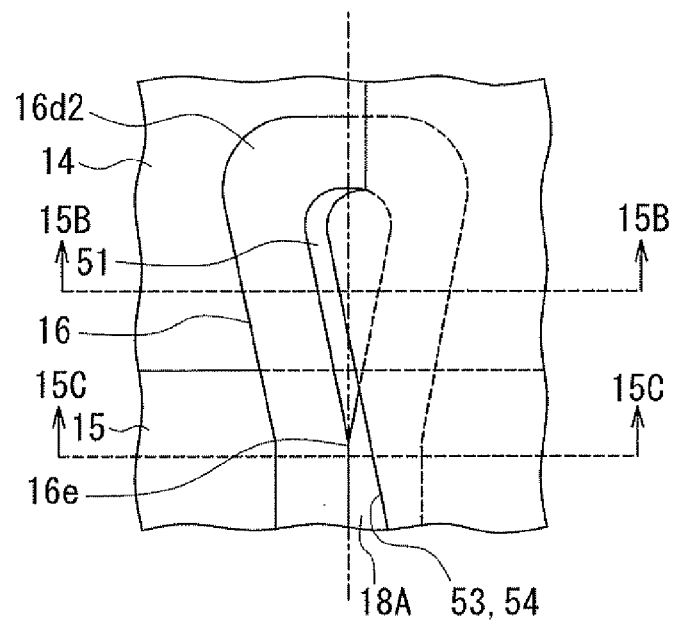
FIG. 15A to FIG. 15C are explanatory diagrams showing a step that follows the step shown in FIG. 14A to FIG. 14C.
Figure 15B:
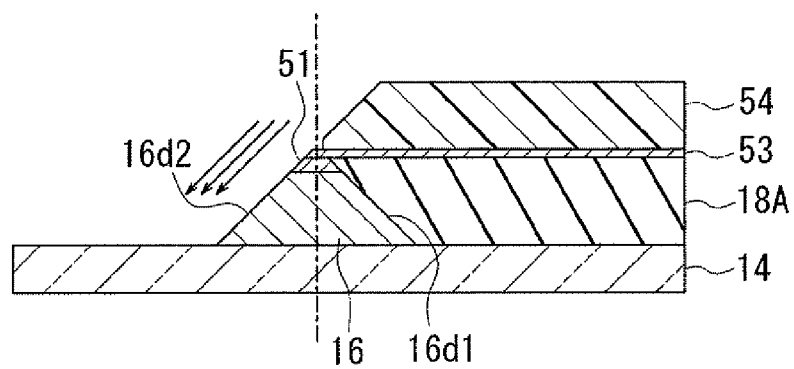
Figure 15C:
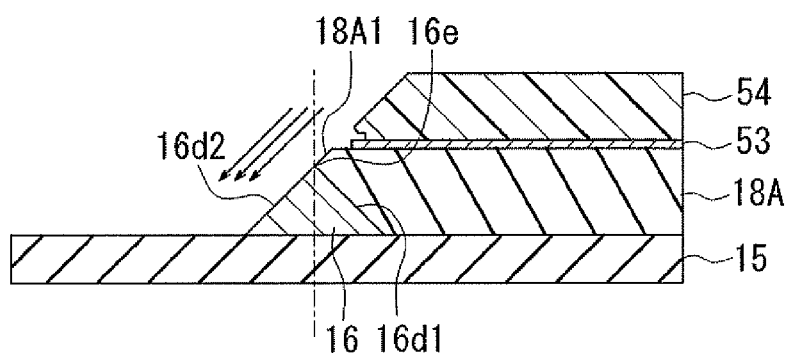

FIG. 15A to FIG. 15C show the next step. In this step, the polishing stopper layer 51 and the metal layer 16P are initially etched by, for example, IBE, by using the photoresist mask 54, the second polishing stopper layer 53, and the coating layer 18A as the etching mask. This step will be referred to as a second etching step. In the second etching step, the angle that the direction of travel of the ion beam forms with respect to the direction perpendicular to the bottom surface of the metal layer 16P is made equal to the angle θ that the third side 16c3 forms with respect to the direction perpendicular to the first side 16c1 (the Z direction) in the front end face 16c of the near-field light generating element 16. This provides the metal layer 16P with a part 16d2 of the side surface 16d continuous with the third side 16c3 of the front end face 16c. This completes the waveguide facing surface 16b and the side surface 16d, and thereby makes the metal layer 16P into the near-field light generating element 16. The photoresist mask 54 is then removed.

In the second etching step, as shown in FIG. 15C, a part of the near-field light generating element 16 including the tip 16c4, or equivalently, the edge part 16e and its vicinity are shaped by etching the metal layer 16P by using the coating layer 18A polished in the polishing step as the etching mask. Here, as shown in FIG. 15C, the coating layer 18A is slightly etched, so that the coating layer 18A is provided with an inclined surface 18A1 continuous with a part of the side surface 16d in the vicinity of the third side 16c3 of the front end face 16c. In the second etching step, the coating layer 18A has an etching rate lower than that of the metal layer 16P. Thus, in the second etching step, the inclined surface 18A1 is formed to constitute a single flat surface with the part of the side surface 16d in the vicinity of the third side 16c3 without being rounded. Consequently, the edge part 16e and the tip 16c4 are formed into a sharply pointed shape without being rounded.

Figure 16A:
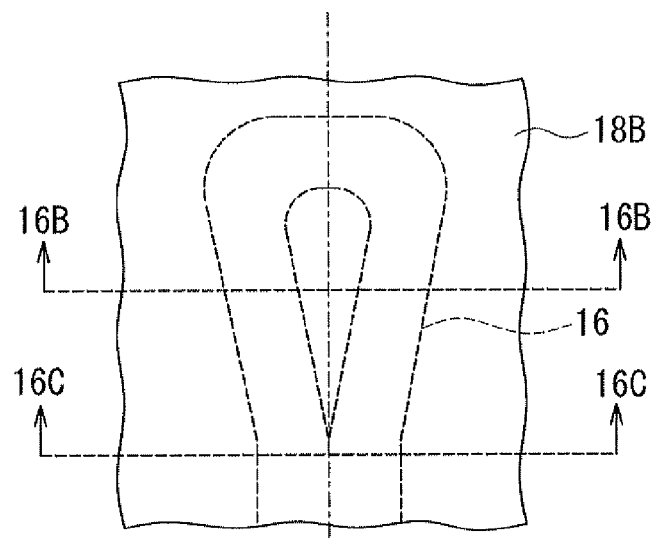
FIG. 16A to FIG. 16C are explanatory diagrams showing a step that follows the step shown in FIG. 15A to FIG. 15C.
Figure 16B:
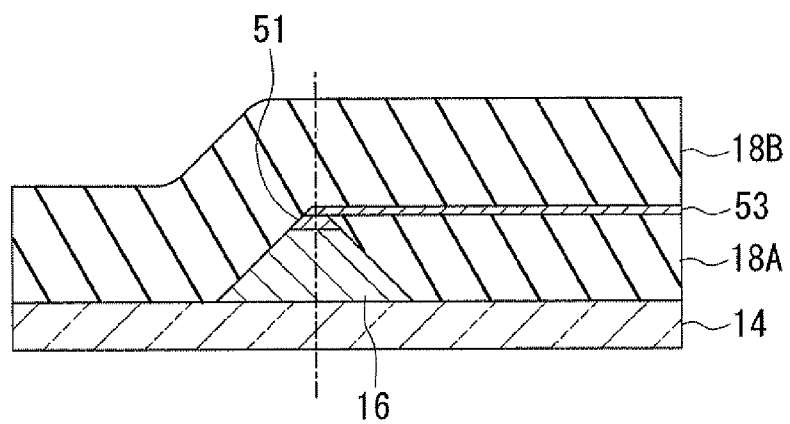
Figure 16C:
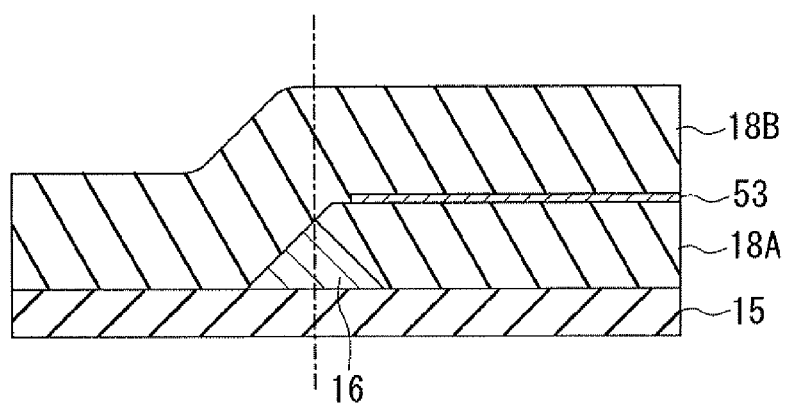

FIG. 16A to FIG. 16C show the next step. In this step, a second coating layer 18B is formed to cover the near-field light generating element 16, the coating layer 18A, and the second polishing stopper layer 53. The second coating layer 18B is formed also over the heat sink layer 14 and the insulating layer 15. The second coating layer 18B is formed to have such a thickness that the top surface of the portion formed over the heat sink layer 14 and the insulating layer 15 lies at a level higher than the top surface of the second polishing stopper layer 53. The thickness of the second coating layer 18B falls within the range of 0.2 to 0.8 µm, for example. While the second coating layer 18B can be made of any material other than conductive materials, it is preferred that the second coating layer 18B be made of the same material as the coating layer 18A.

Figure 17A:
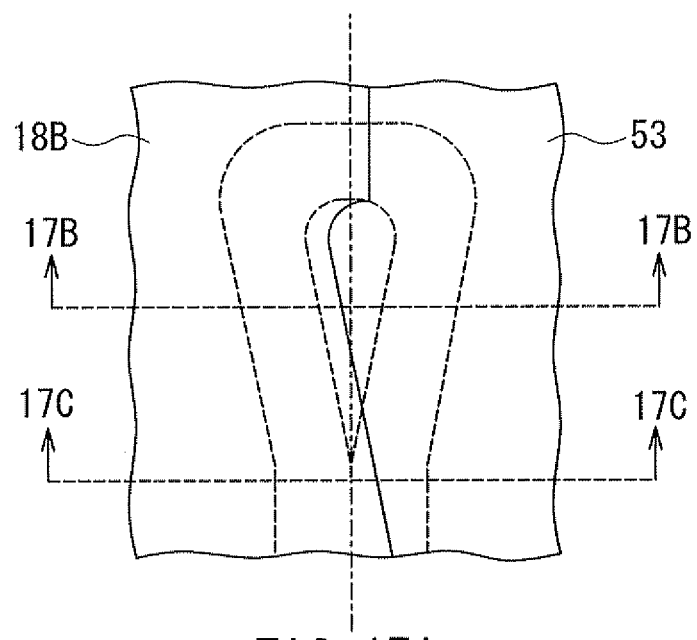
FIG. 17A to FIG. 17C are explanatory diagrams showing a step that follows the step shown in FIG. 16A to FIG. 16C.
Figure 17B:
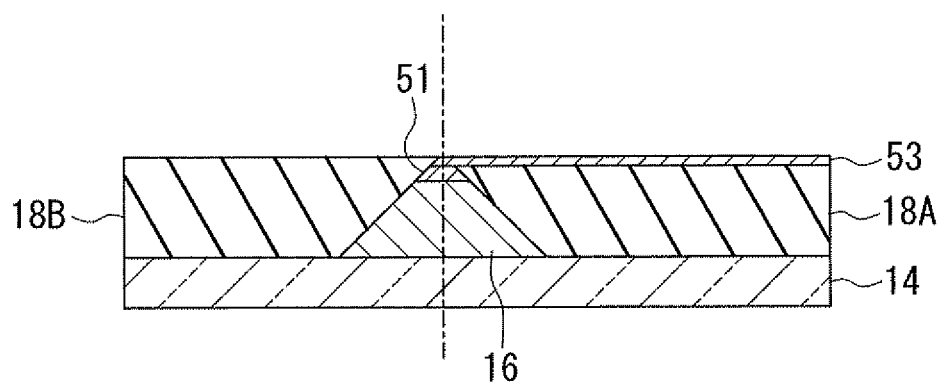
Figure 17C:
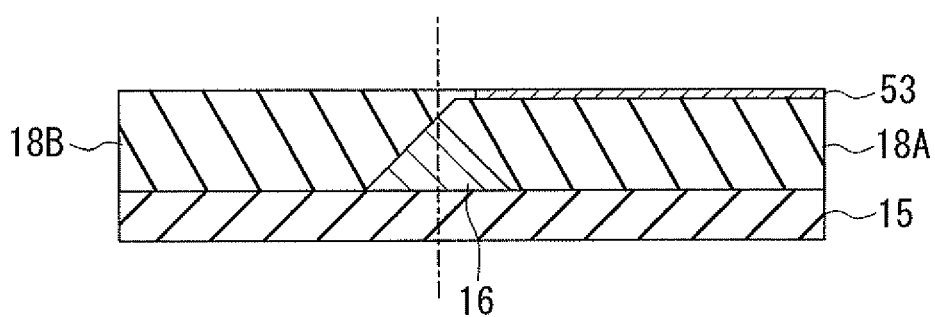

FIG. 17A to FIG. 17C show the next step. In this step, the second coating layer 18B is polished by, for example, CMP, until the second polishing stopper layer 53 is exposed. This step will be referred to as a second polishing step.

Figure 18A:
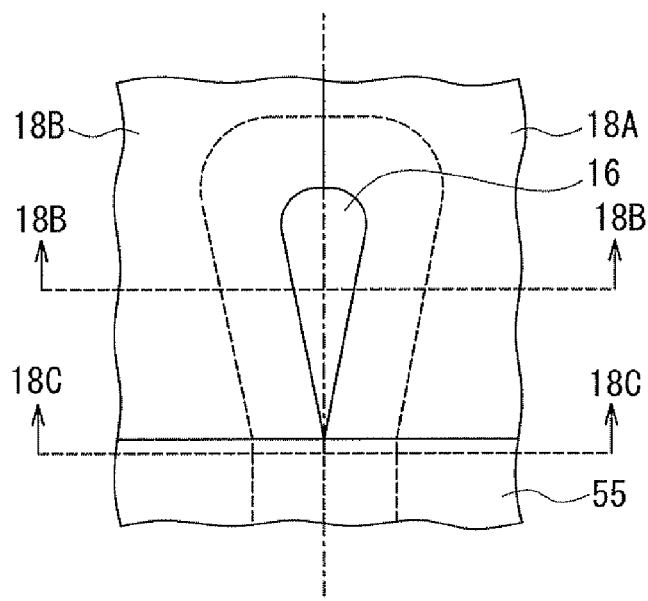
FIG. 18A to FIG. 18C are explanatory diagrams showing a step that follows the step shown in FIG. 17A to FIG. 17C.
Figure 18B:
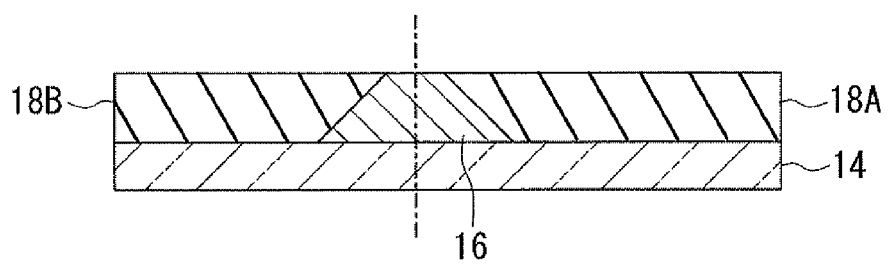
Figure 18C:
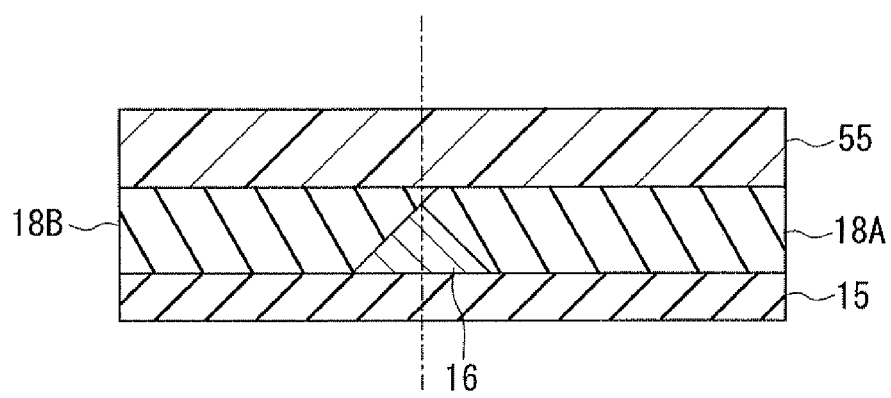

FIG. 18A to FIG. 18C show the next step. In this step, IBE or RIE, for example, is initially performed to remove the second polishing stopper layer 53 and slightly etch the second coating layer 18B so that the coating layer 18A and the second coating layer 18B are flattened at the top. Next, a photoresist mask 55 is formed on top of the coating layer 18A and the second coating layer 18B at a position above the edge part 16e. The photoresist mask 55 does not cover the polishing stopper layer 51 remaining on the waveguide facing surface 16b. Next, the polishing stopper layer 51 is removed by, for example, IBE or RIE, to expose the waveguide facing surface 16b. At the same time, the coating layer 18A and the second coating layer 18B are slightly etched so that the waveguide facing surface 16b, the coating layer 18A, and the second coating layer 18B are flattened at the top. The coating layer 18A and the second coating layer 18B remaining after this step constitute the surrounding layer 18.

Figure 19A:
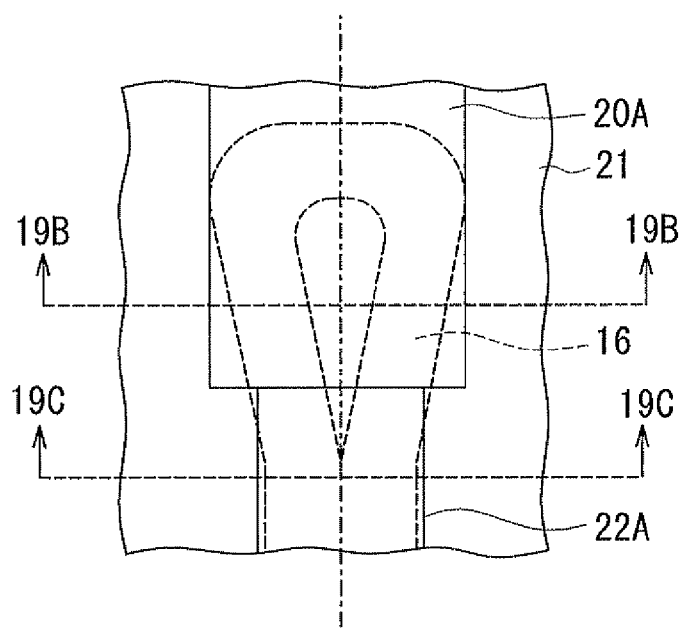
FIG. 19A to FIG. 19C are explanatory diagrams showing a step that follows the step shown in FIG. 18A to FIG. 18C.
Figure 19B:
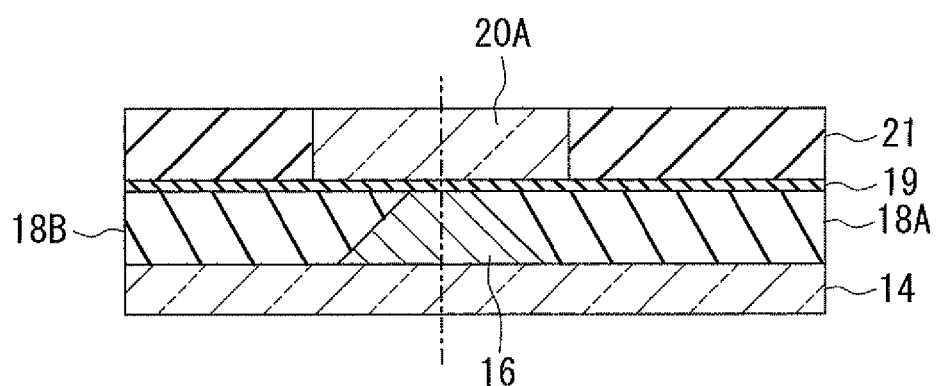
Figure 19C:
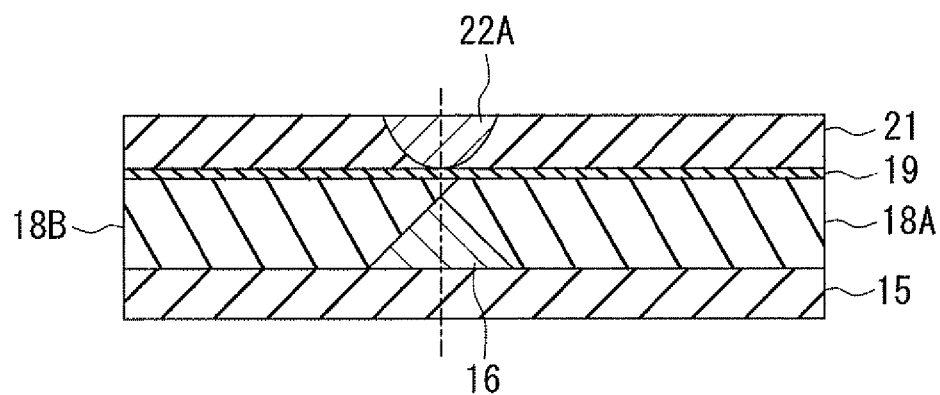

The near-field light generating element 16 and the surrounding layer 18 are formed through the series of steps shown in FIG. 8A to FIG. 18C. FIG. 19A to FIG. 19C show a step after the formation of the near-field light generating element 16 and the surrounding layer 18. In this step, the clad layer 19 is initially formed over the near-field light generating element 16 and the surrounding layer 18. Next, the clad layer 21, the first layer 22A of the magnetic pole 22, and the first layer 20A of the waveguide 20 are formed on the clad layer 19.

As has been described, the heat-assisted magnetic recording head according to the present embodiment includes the near-field light generating element 16, the waveguide 20, and the magnetic pole 22. The outer surface of the near-field light generating element 16 includes the bottom surface 16a, the waveguide facing surface 16b, the front end face 16c, and the side surface 16d. The front end face 16c includes: the first side 16c1 that lies at the end of the bottom surface 16a; the tip 16c4 that lies at the end farther from the top surface 1a of the substrate 1 and forms the near-field light generating part 16g; the second side 16c2 that connects an end of the first side 16c1 to the tip 16c4; and the third side 16c3 that connects the other end of the first side 16c1 to the tip 16c4. The waveguide facing surface 16b includes the width changing portion 16b1 that decreases in width with decreasing distance to the front end face 16c. The front end part 16b3 of the waveguide facing surface 16b is connected via the edge part 16e to the tip 16c4 of the front end face 16c that forms the near-field light generating part 16g.

In the present embodiment, the bottom surface of the waveguide 20 is opposed to the waveguide facing surface 16b of the near-field light generating element 16 with a predetermined distance therebetween. In the present embodiment, evanescent light occurs from the bottom surface of the waveguide 20 based on the light propagated through the waveguide 20. Based on the evanescent light, surface plasmons are then excited on the waveguide facing surface 16b of the near-field light generating element 16. The surface plasmons are propagated to the near-field light generating part 16g, and near-field light occurs from the near-field light generating part 16g based on the surface plasmons. According to the present embodiment, it is possible to increase the efficiency of transformation of the light propagated through the waveguide 20 into the near-field light, as compared with the conventional case where a plasmon antenna is directly irradiated with laser light to produce near-field light.

According to the present embodiment, it is possible suppress a temperature rise of the near-field light generating element 16 because the near-field light generating element 16 is not directly irradiated with the laser light propagated through the waveguide 20. In the present embodiment, the length $H_{P41}$ of the near-field light generating element 16 in the direction perpendicular to the medium facing surface 40 is greater than the length $T_{P4}$ of the front end face 16c in the direction perpendicular to the bottom surface 16a of the near-field light generating element 16. Thus, the near-field light generating element 16 of the present embodiment is greater in volume than a conventional plasmon antenna in which the length in the direction perpendicular to the medium facing surface 40 is smaller than the length in the direction perpendicular to the top surface 1a of the substrate 1. This also contributes to suppression of a temperature rise of the near-field light generating element 16. Consequently, according to the present embodiment, it is possible to prevent the near-field light generating element 16 from protruding from the medium facing surface 40.

According to the present embodiment, as previously mentioned, it is also possible to excite a lot of surface plasmons on the waveguide facing surface 16b, and to concentrate the surface plasmons excited on the waveguide facing surface 16b at the near-field light generating part 16g. Consequently, according to the present embodiment, it is possible to generate near-field light that has a small spot diameter and sufficient intensity.

In the method of manufacturing the near-field light generating element 16 according to the present embodiment, a part of the near-field light generating element 16 including the tip 16c4, or equivalently, the edge part 16e and its vicinity are shaped by etching the metal layer 16P by using the coating layer 18A polished in the polishing step as the etching mask. In the second etching step, the coating layer 18A has an etching rate lower than that of the metal layer 16P. In the second etching step, it is therefore possible to prevent the edge part 16e and the tip 16c4 from being rounded, so that the edge part 16e and the tip 16c4 can be formed into a sharply pointed shape. Consequently, according to the present embodiment, it is possible to manufacture the near-field light generating element 16 that has the front end face 16c with the top end, i.e., tip 16c4, of sharply pointed shape. The tip 16c4 forms the near-field light generating part 16g. According to the present embodiment, it is possible to concentrate a lot of surface plasmons at the tip 16c4 (the near-field light generating part 16g) of sharply pointed shape. Consequently, the present embodiment makes it possible to generate near-field light having a small spot diameter and sufficient intensity.

In the present embodiment, the step of forming the near-field light generating element 16 includes the step of forming the second polishing stopper layer 53 on the coating layer 18A between the polishing step and the second etching step. The second polishing stopper layer 53 is intended for use in the second polishing step to be performed later. The method of manufacturing the heat-assisted magnetic recording head according to the present embodiment includes: the step of forming the second coating layer 18B to cover the near-field light generating element 16, the coating layer 18A and the second polishing stopper layer 53 after the second etching step; the second polishing step of polishing the second coating layer 18B until the second polishing stopper layer 53 is exposed; and the step of removing the second polishing stopper layer 53 and the polishing stopper layer 51 after the second polishing step. According to the present embodiment, it is thus possible to define the level of the top surface of the second coating layer 18B while preventing the edge part 16e of the near-field light generating element 16 from being polished. Consequently, according to the present embodiment, it is possible to precisely define the distance between the edge part 16e and the bottom end of the magnetic pole 22 and the distance between the waveguide facing surface 16b and the bottom surface of the waveguide 20.

Figure 20:
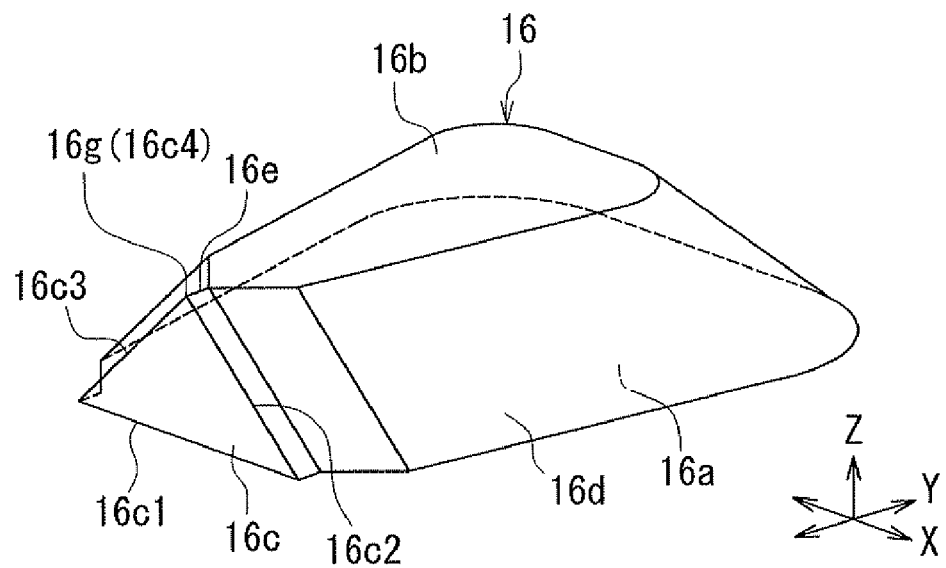
FIG. 20 is a perspective view showing a near-field light generating element of a modification example of the first embodiment of the invention.
Figure 21:
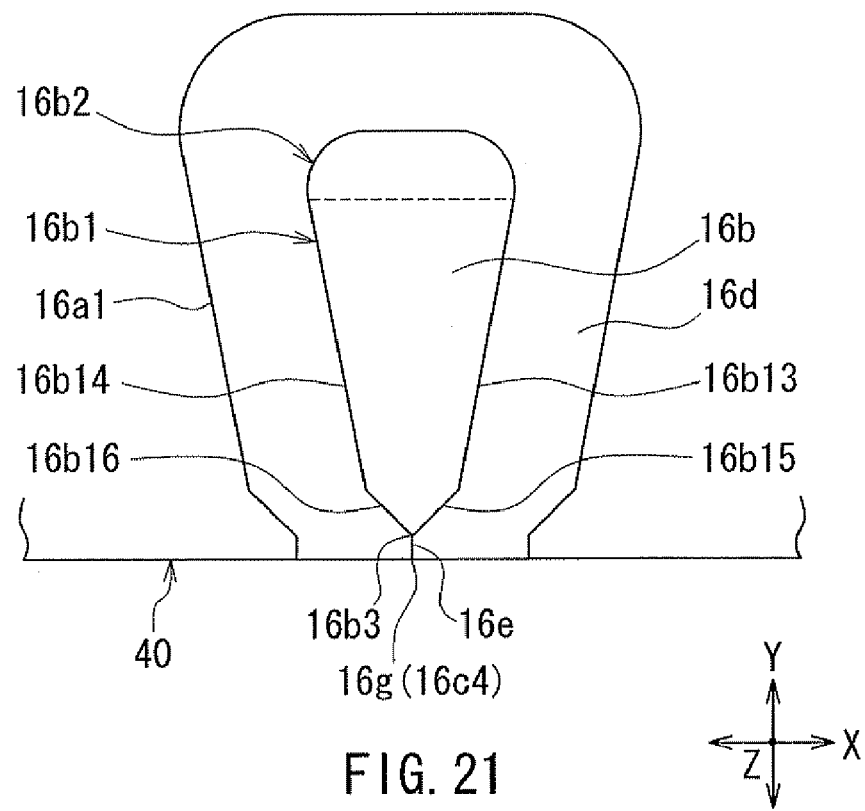
FIG. 21 is a plan view of the near-field light generating element shown in FIG. 20.

A near-field light generating element of a modification example of the present embodiment will now be described with reference to FIG. 20 and FIG. 21. FIG. 20 is a perspective view showing the near-field light generating element of the modification example. FIG. 21 is a plan view of the near-field light generating element shown in FIG. 20. In the near-field light generating element 16 of the modification example, the width changing portion 16b1 of the waveguide facing surface 16b has two sides 16b13 and 16b14 that lie on opposite sides in the direction parallel to the bottom surface 16a and the front end face 16c (the X direction), and two sides 16b15 and 16b16 that are located closer to the medium facing surface 40 than are the sides 16b13 and 16b14. The side 16b15 connects an end of the side 16b13 closer to the medium facing surface 40 and the front end part 16b3 to each other. The side 16b16 connects an end of the side 16b14 closer to the medium facing surface 40 and the front end part 16b3 to each other. An angle formed between the sides 16b15 and 16b16 is greater than that formed between the sides 16b13 and 16b14.

The near-field light generating element 16 of the modification example can be manufactured by changing the shape of the photoresist mask 52 used in the step shown in FIG. 9A to FIG. 9C and the shape of the photoresist mask 54 used in the step shown in FIG. 14A to FIG. 14C to conform to the shape of the waveguide facing surface 16b of the modification example.

[Second Embodiment]

A near-field light generating element and a method of manufacturing the same, and a heat-assisted magnetic recording head according to a second embodiment of the invention will now be described with reference to FIG. 22A to FIG. 33C. FIG. 22A to FIG. 33C show the step of forming the near-field light generating element 16 and the surrounding layer 18 of the present embodiment. The step of forming the near-field light generating element 16 and the surrounding layer 18 includes forming the near-field light generating element 16. The following description includes the description of the method of manufacturing the near-field light generating element 16 according to the present embodiment.

FIG. 22A to FIG. 33C each show a stack of layers in the process of forming the near-field light generating element 16 and the surrounding layer 18. The portions lying below the heat sink layer 14 and the insulating layer 15 are omitted in FIG. 22A to FIG. 33C. Of FIG. 22A to FIG. 33C, FIG. nA (n is any integer between 22 and 33 inclusive) is a plan view of the stack. FIG. nB is a cross-sectional view showing a cross section of the stack taken at the position shown by the line nB-nB of FIG. nA. FIG. nC is a cross-sectional view showing a cross section of the stack taken at the position shown by the line nC-nC of FIG. nA. The position shown by the line nC-nC is the position where the medium facing surface 40 is to be formed.

Figure 22A:
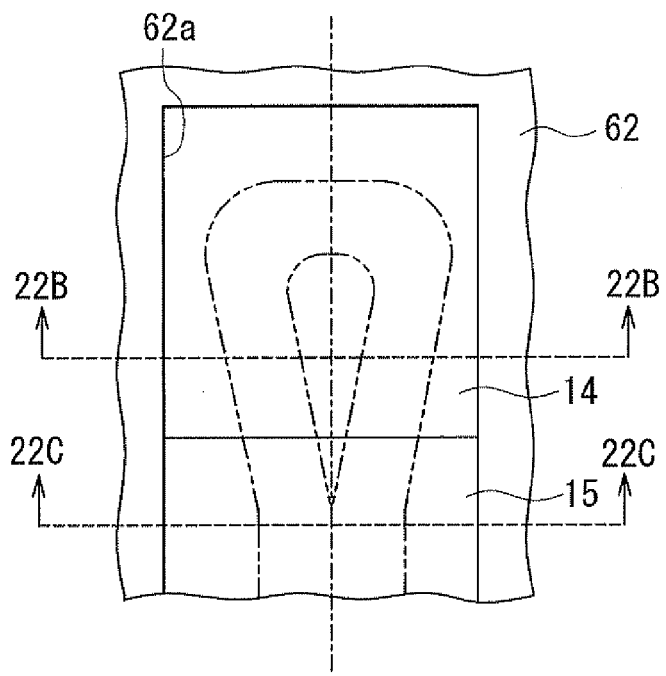
FIG. 22A to FIG. 22C are explanatory diagrams showing a step of a method of manufacturing a heat-assisted magnetic recording head according to a second embodiment of the invention.
Figure 22B:
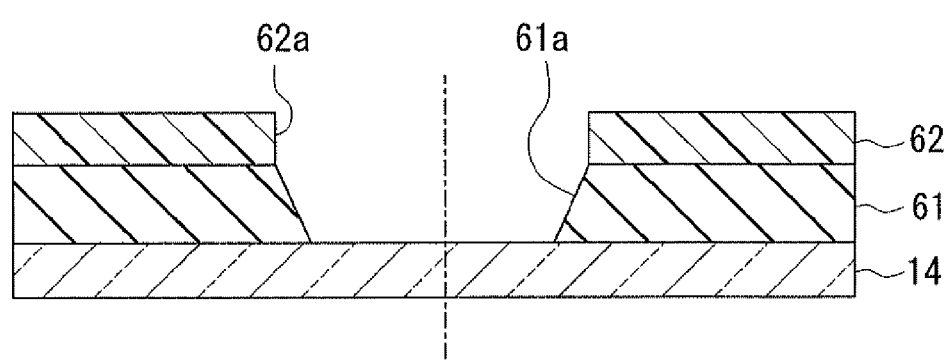
Figure 22C:
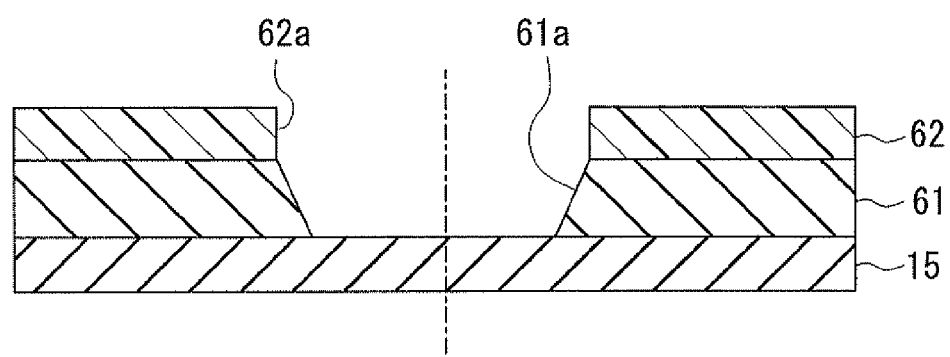

FIG. 22A to FIG. 22C show a step after the formation of the heat sink layer 14 and the insulating layer 15. In this step, an accommodating layer 61 is initially formed over the heat sink layer 14 and the insulating layer 15. The accommodating layer 61 is made of a material that has an etching rate lower than that of the metal layer 16P in first and second etching steps to be performed later. The accommodating layer 61 has an accommodating part 61a in which the metal layer 16P is to be accommodated later. Like the coating layer 18A of the first embodiment, the accommodating layer 61 may be made of a non-metallic inorganic material. The accommodating layer 61 has a thickness greater than the length $T_{P4}$ of the front end face 16c of the near-field light generating element 16. The accommodating part 61a penetrates through the accommodating layer 61. The cross section of the accommodating part 61a parallel to the top surfaces of the heat sink layer 14 and the insulating layer 15 increases in size with increasing distance from the top surfaces of the heat sink layer 14 and the insulating layer 15.

The accommodating layer 61 is formed in the following way, for example. First, an initial accommodating layer is formed over the heat sink layer 14 and the insulating layer 15. The initial accommodating layer is to be etched later to become the accommodating layer 61. Next, a photoresist mask 62 having an opening 62a is formed on the initial accommodating layer. Next, the initial accommodating layer is taper-etched by, for example, RIE, by using the photoresist mask 62 as the etching mask. This provides the initial accommodating layer with the accommodating part 61a, and thereby makes the initial accommodating layer into the accommodating layer 61.

Figure 23A:
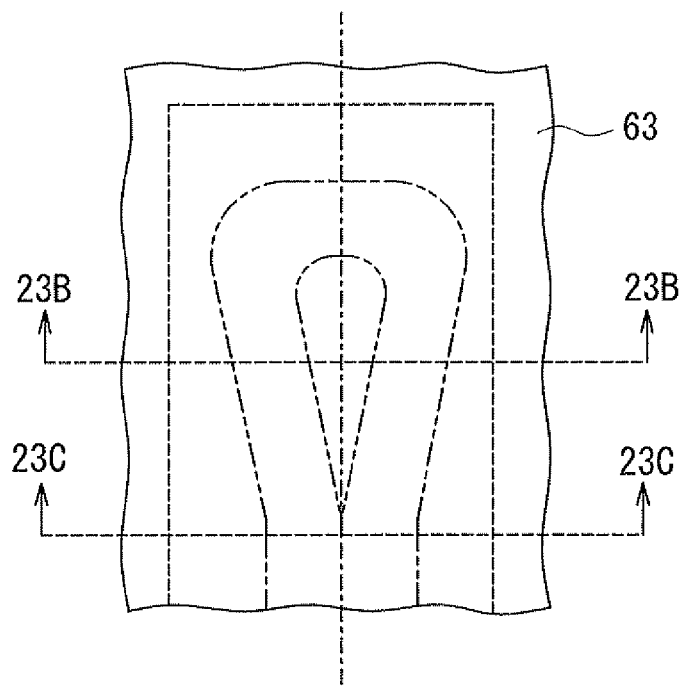
FIG. 23A to FIG. 23C are explanatory diagrams showing a step that follows the step shown in FIG. 22A to FIG. 22C.
Figure 23B:
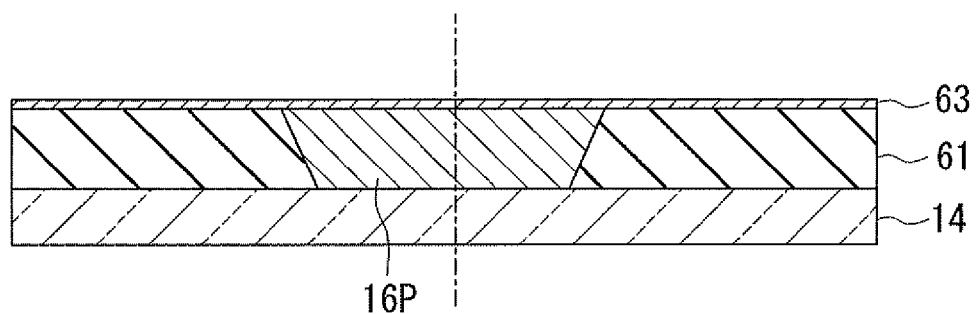
Figure 23C:
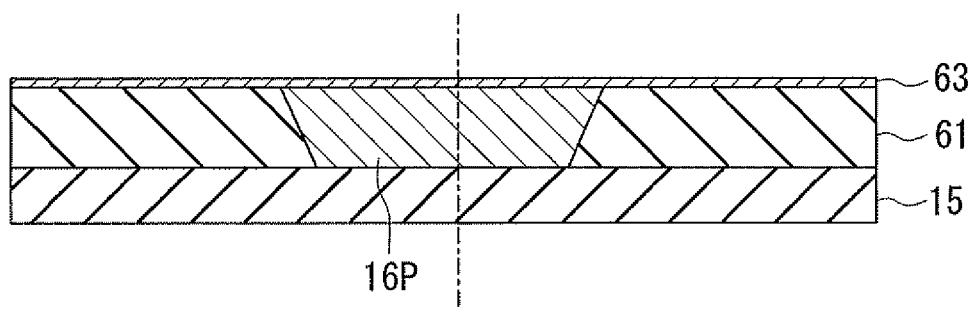

FIG. 23A to FIG. 23C show the next step. In this step, the metal layer 16P is initially formed by, for example, sputtering, so as to be accommodated in the accommodating part 61a. Next, the accommodating layer 61 and the metal layer 16P are flattened at the top by CMP, for example. At this point in time, the metal layer 16P has a thickness in the range of 100 to 500 nm, for example. Next, a polishing stopper layer 63 is formed over the accommodating layer 61 and the metal layer 16P by sputtering, for example. The polishing stopper layer 63 is intended for use in a polishing step to be performed later. The thickness and material of the polishing stopper layer 63 are the same as those of the polishing stopper layer 51 of the first embodiment.

Figure 24A:
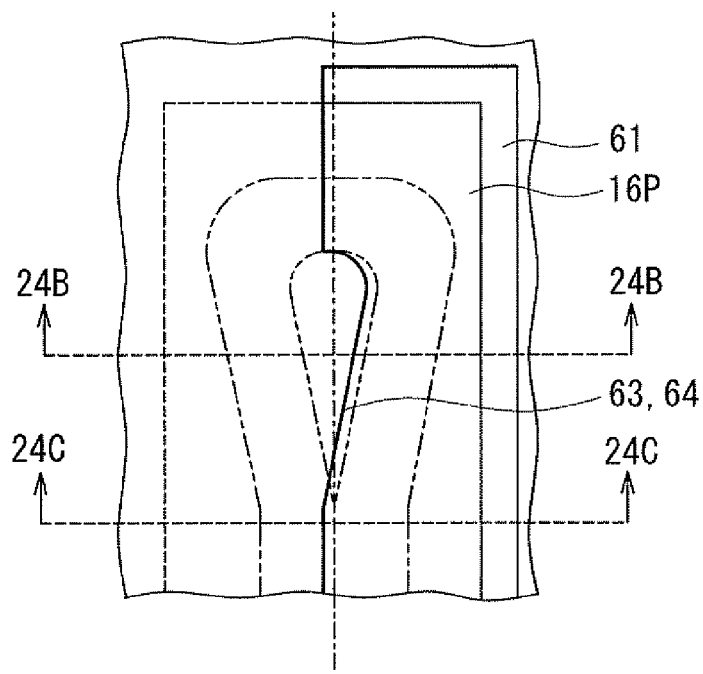
FIG. 24A to FIG. 24C are explanatory diagrams showing a step that follows the step shown in FIG. 23A to FIG. 23C.
Figure 24B:
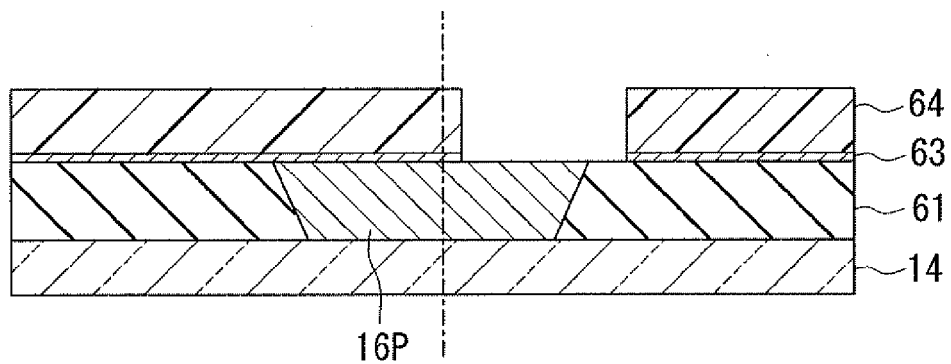
Figure 24C:
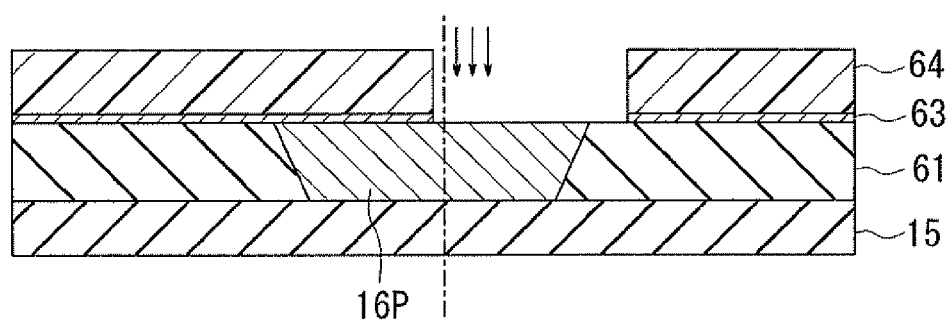

FIG. 24A to FIG. 24C show the next step. In this step, a photoresist mask 64 is initially formed on the polishing stopper layer 63. Next, the polishing stopper layer 63 is etched by, for example, IBE, by using the photoresist mask 64 as the etching mask. The polishing stopper layer 63 thus etched covers an area of the metal layer 16P where the waveguide facing surface 16b is to be formed later and an area of the metal layer 16P where a part of the side surface 16d continuous with the third side 16c3 of the front end face 16c is to be formed later.

Figure 25A:
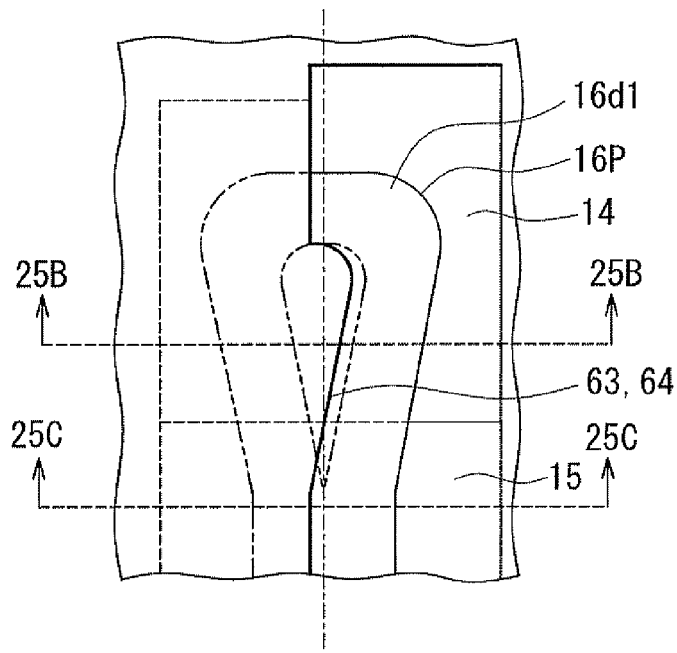
FIG. 25A to FIG. 25C are explanatory diagrams showing a step that follows the step shown in FIG. 24A to FIG. 24C.
Figure 25B:
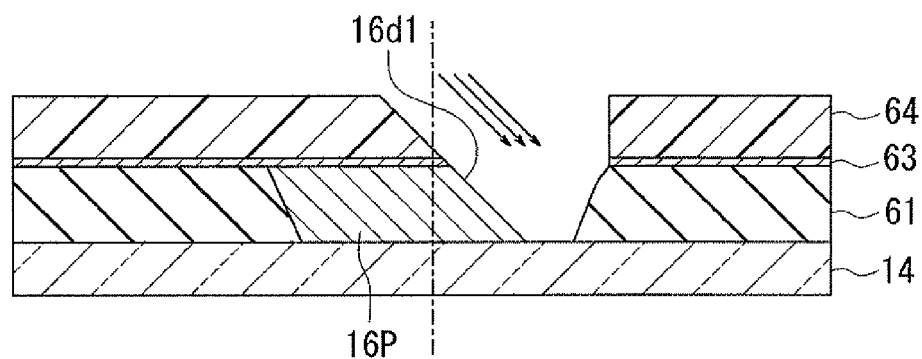
Figure 25C:
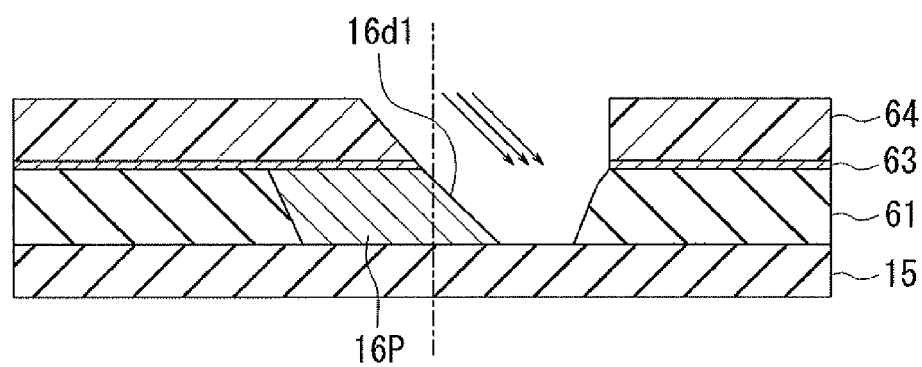

FIG. 25A to FIG. 25C show the next step. In this step, the polishing stopper layer 63 and the metal layer 16P are etched by, for example, IBE, by using the photoresist mask 64 as the etching mask. This step will be referred to as a first etching step. In the first etching step, the angle that the direction of travel of the ion beam forms with respect to the direction perpendicular to the bottom surface of the metal layer 16P is made equal to the angle θ that the second side 16c2 forms with respect to the direction perpendicular to the first side 16c1 (the Z direction) in the front end face 16c of the near-field light generating element 16. This provides the metal layer 16P with a part 16d1 of the side surface 16d continuous with the second side 16c2 of the front end face 16c. The photoresist mask 64 is then removed.

Figure 26A:
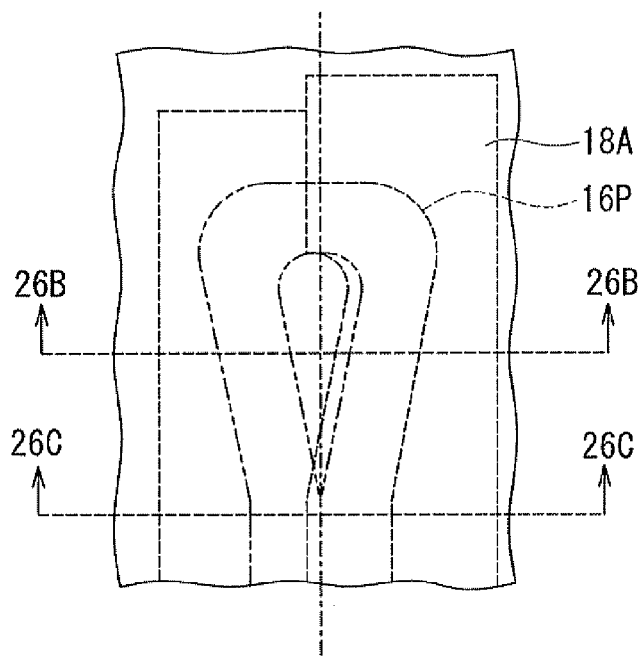
FIG. 26A to FIG. 26C are explanatory diagrams showing a step that follows the step shown in FIG. 25A to FIG. 25C.
Figure 26B:
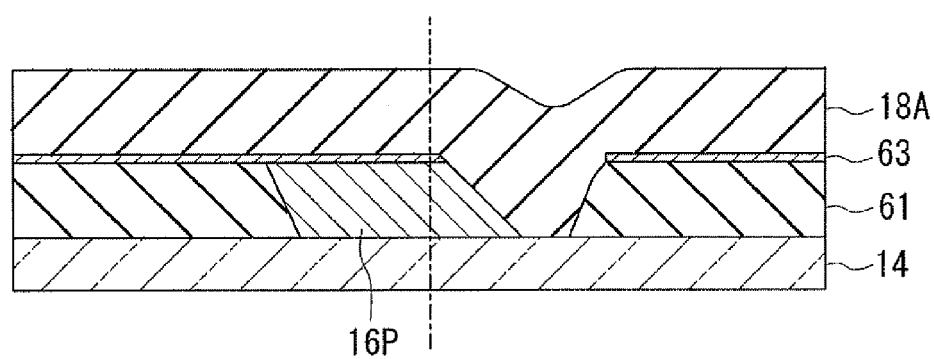
Figure 26C:
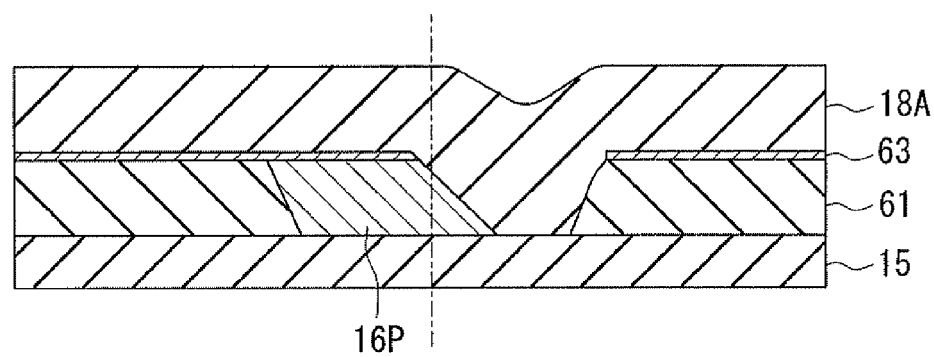

FIG. 26A to FIG. 26C show the next step. In this step, the coating layer 18A is formed to cover the polishing stopper layer 63 and the metal layer 16P provided with the part 16d1 of the side surface 16d. The coating layer 18A is formed also over the heat sink layer 14 and the insulating layer 15. The coating layer 18A is formed to have such a thickness that the top surface of the portion formed over the heat sink layer 14 and the insulating layer 15 lies at a level higher than the top surface of the second polishing stopper layer 63. The thickness of the coating layer 18A falls within the range of 0.2 to 0.8 μm, for example. The coating layer 18A is made of a non-metallic inorganic material that has an etching rate lower than that of the metal layer 16P in a second etching step to be performed later. The material of the coating layer 18A is the same as in the first embodiment.

Figure 27A:
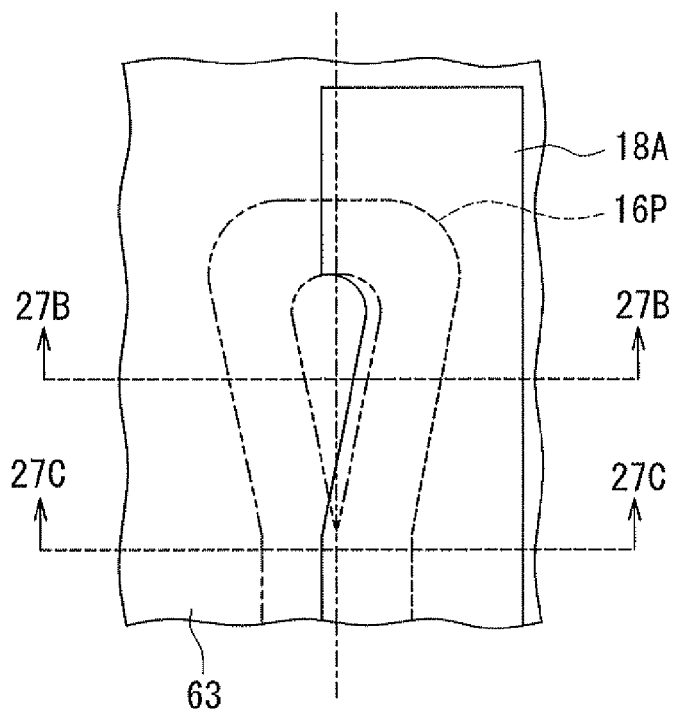
FIG. 27A to FIG. 27C are explanatory diagrams showing a step that follows the step shown in FIG. 26A to FIG. 26C.
Figure 27B:
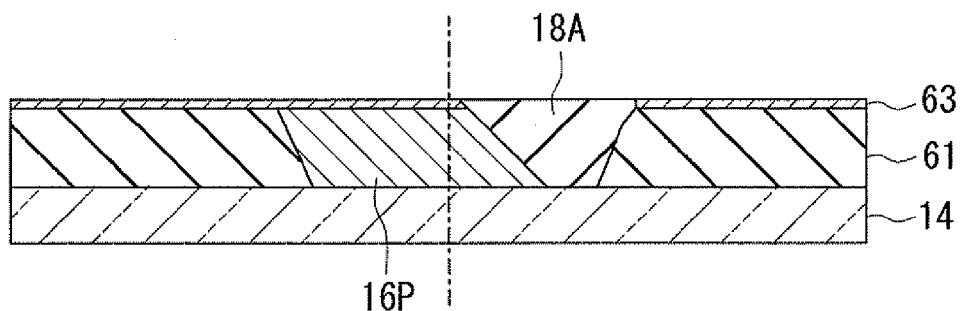
Figure 27C:
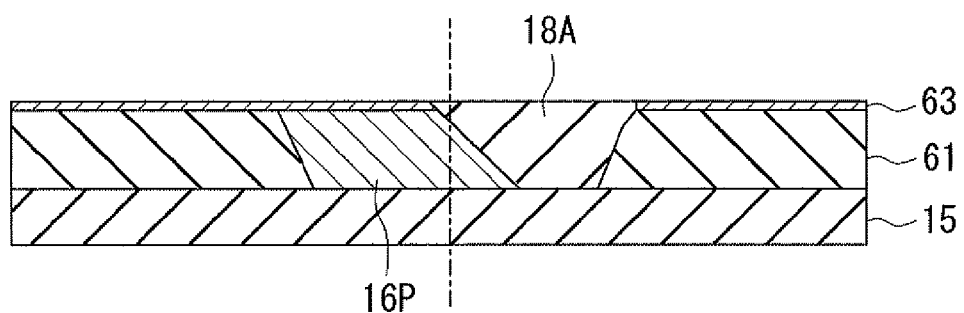

FIG. 27A to FIG. 27C show the next step. In this step, the coating layer 18A is polished by, for example, CMP, until the polishing stopper layer 63 is exposed. This step will be referred to as a polishing step.

Figure 28A:
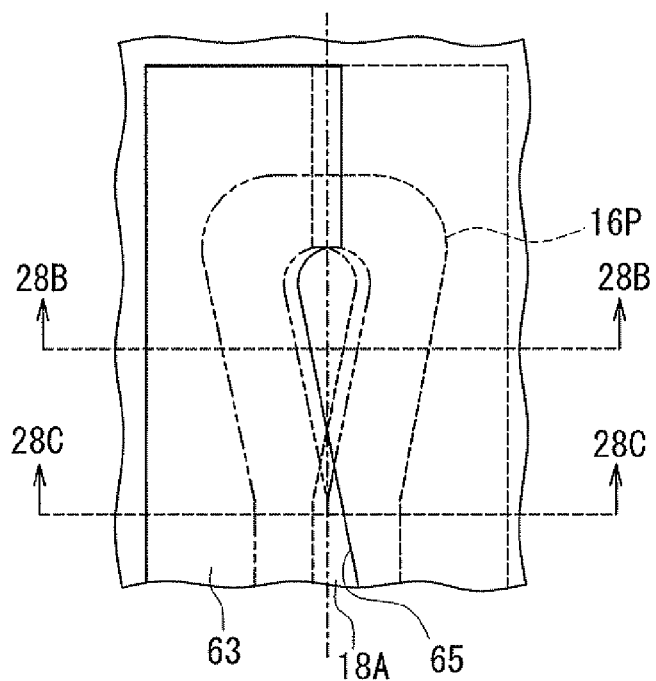
FIG. 28A to FIG. 28C are explanatory diagrams showing a step that follows the step shown in FIG. 27A to FIG. 27C.
Figure 28B:
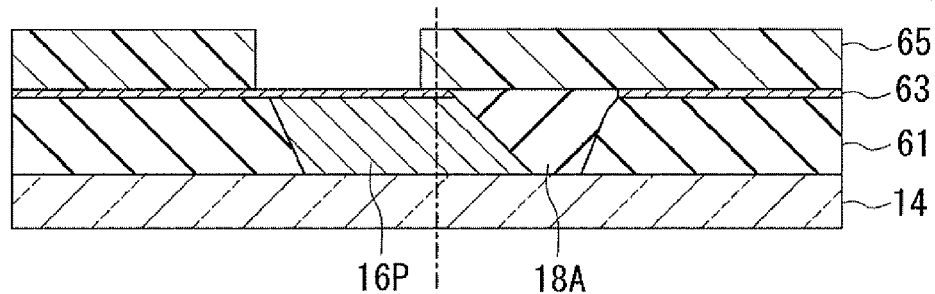
Figure 28C:
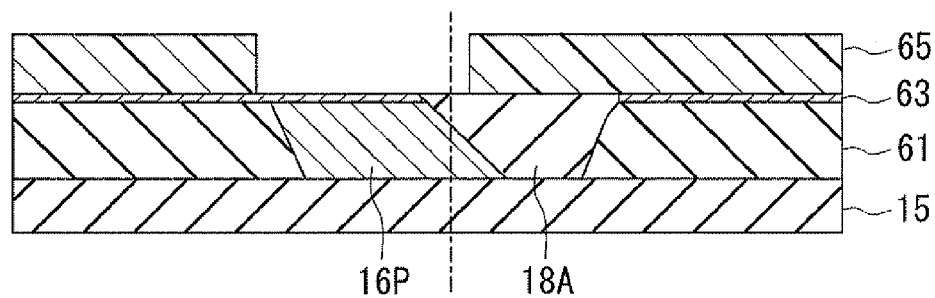

FIG. 28A to FIG. 28C show the next step. In this step, a photoresist mask 65 is formed on top of the polishing stopper layer 63 and the coating layer 18A. The photoresist mask 65 has an opening that is located above a part of the metal layer 16P that is to be etched in the second etching step to be performed later. As shown in FIG. 28A and FIG. 28C, the photoresist mask 65 does not cover a part of the coating layer 18A lying on the part 16d1 of the side surface 16d in the vicinity of the position where the medium facing surface 40 is to be formed.

Figure 29A:
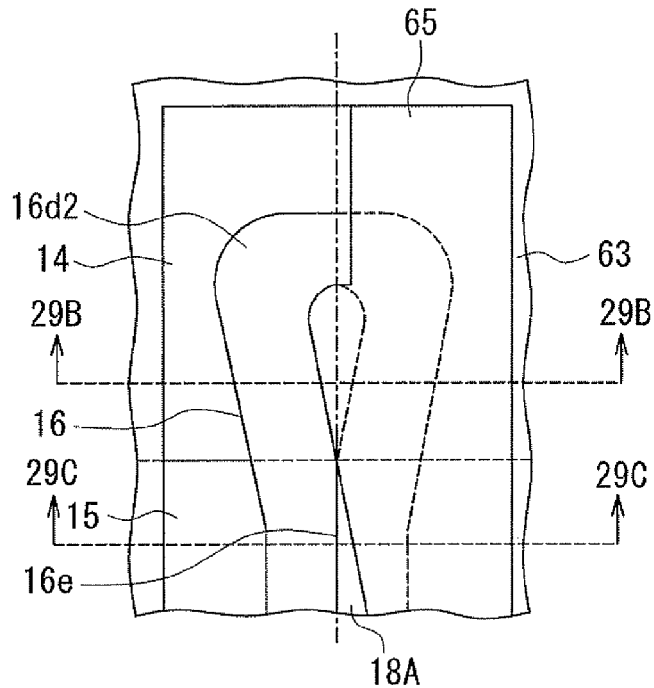
FIG. 29A to FIG. 29C are explanatory diagrams showing a step that follows the step shown in FIG. 28A to FIG. 28C.
Figure 29B:
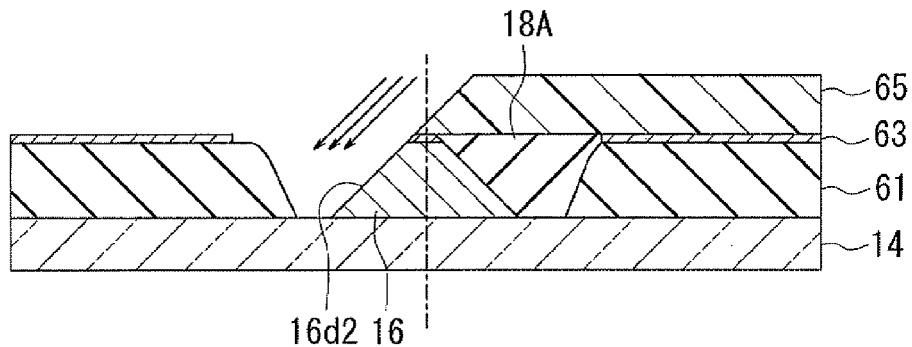
Figure 29C:
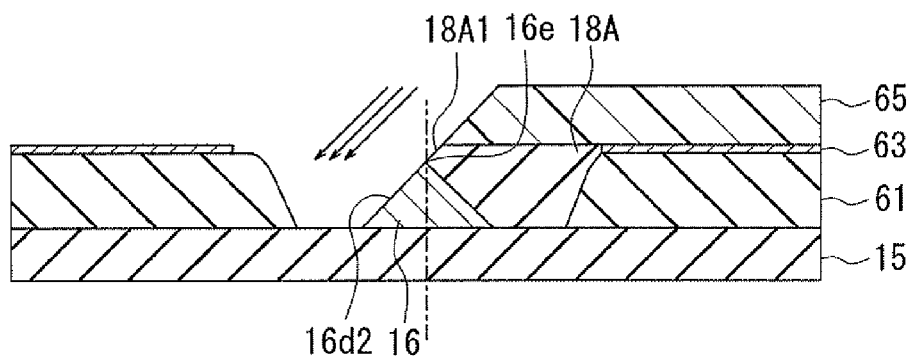

FIG. 29A to FIG. 29C show the next step. In this step, the polishing stopper layer 63 and the metal layer 16P are initially etched by, for example, IBE, by using the photoresist mask 65 and the coating layer 18A as the etching mask. This step will be referred to as the second etching step. In the second etching step, the angle that the direction of travel of the ion beam forms with respect to the direction perpendicular to the bottom surface of the metal layer 16P is made equal to the angle θ that the third side 16c3 forms with respect to the direction perpendicular to the first side 16c1 (the Z direction) in the front end face 16c of the near-field light generating element 16. This provides the metal layer 16P with a part 16d2 of the side surface 16d continuous with the third side 16c3 of the front end face 16c. This completes the waveguide facing surface 16b and the side surface 16d, and thereby makes the metal layer 16P into the near-field light generating element 16. The photoresist mask 65 is then removed.

In the second etching step, as shown in FIG. 29C, a part of the near-field light generating element 16 including the tip 16c4, or equivalently, the edge part 16e and its vicinity are shaped by etching the metal layer 16P by using the coating layer 18A polished in the polishing step as the etching mask. Here, as shown in FIG. 29C, the coating layer 18A is slightly etched, so that the coating layer 18A is provided with an inclined surface 18A1 continuous with a part of the side surface 16d in the vicinity of the third side 16c3. In the second etching step, the coating layer 18A has an etching rate lower than that of the metal layer 16P. Thus, in the second etching step, the inclined surface 18A1 is formed to constitute a single flat surface with the part of the side surface 16d in the vicinity of the third side 16c3 without being rounded. Consequently, the edge part 16e and the tip 16c4 are formed into a sharply pointed shape without being rounded. After the second etching step, the polishing stopper layer 63 remains on the accommodating layer 61. In the second etching step, the metal layer 16P is preferably etched so that the edge part 16e lies at a level lower than the bottom surface of the polishing stopper layer 63.

Figure 30A:
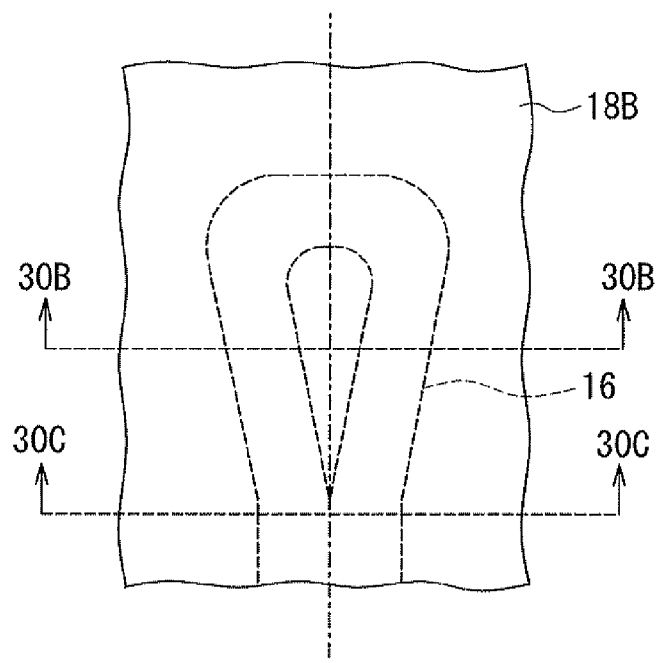
FIG. 30A to FIG. 30C are explanatory diagrams showing a step that follows the step shown in FIG. 29A to FIG. 29C.
Figure 30B:
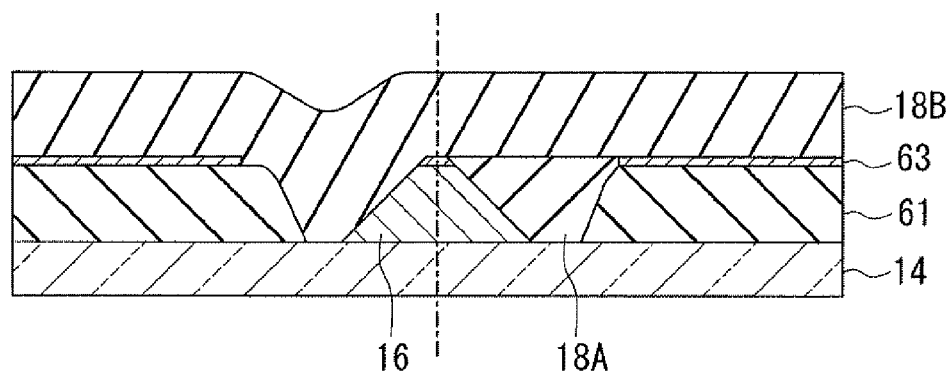
Figure 30C:
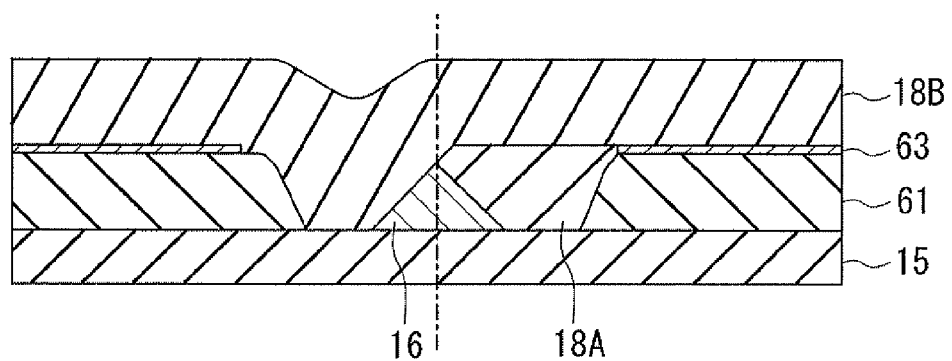

FIG. 30A to FIG. 30C show the next step. In this step, the second coating layer 18B is formed to cover the accommodating layer 61, the polishing stopper layer 63, the near-field light generating element 16, and the coating layer 18A. The second coating layer 18B is formed also over the heat sink layer 14 and the insulating layer 15. The second coating layer 18B is formed to have such a thickness that the top surface of the portion formed over the heat sink layer 14 and the insulating layer 15 lies at a level higher than the top surface of the polishing stopper layer 63. The thickness and material of the second coating layer 18B are the same as in the first embodiment.

Figure 31A:
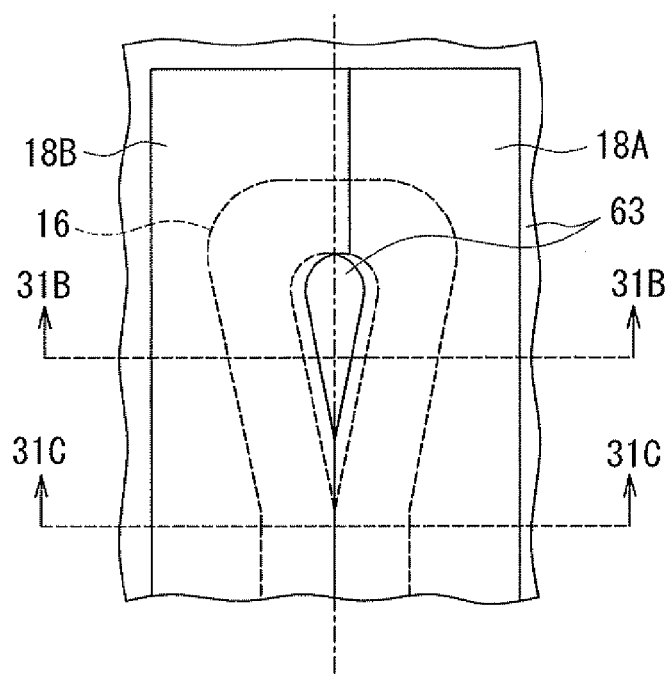
FIG. 31A to FIG. 31C are explanatory diagrams showing a step that follows the step shown in FIG. 30A to FIG. 30C.
Figure 31B:
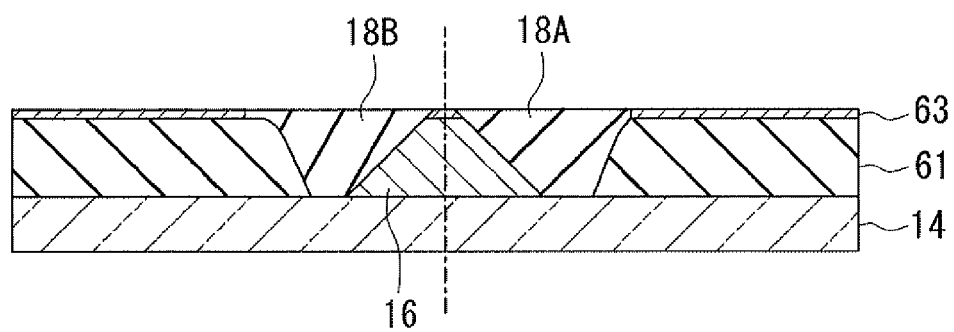
Figure 31C:
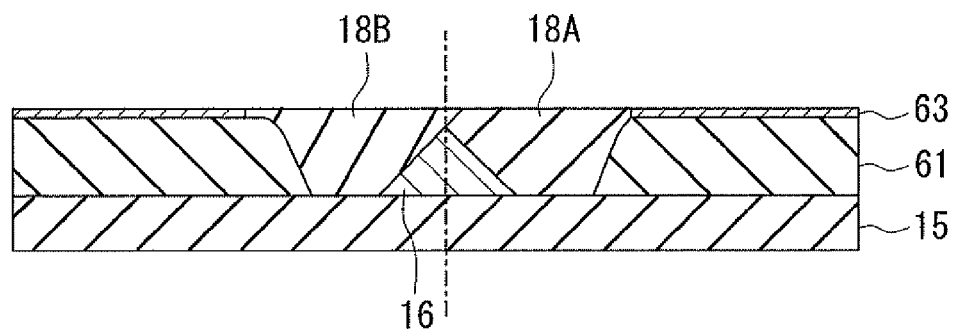

FIG. 31A to FIG. 31C show the next step. In this step, the second coating layer 18B is polished by, for example, CMP, until the polishing stopper layer 63 is exposed. This step will be referred to as a second polishing step.

Figure 32A:
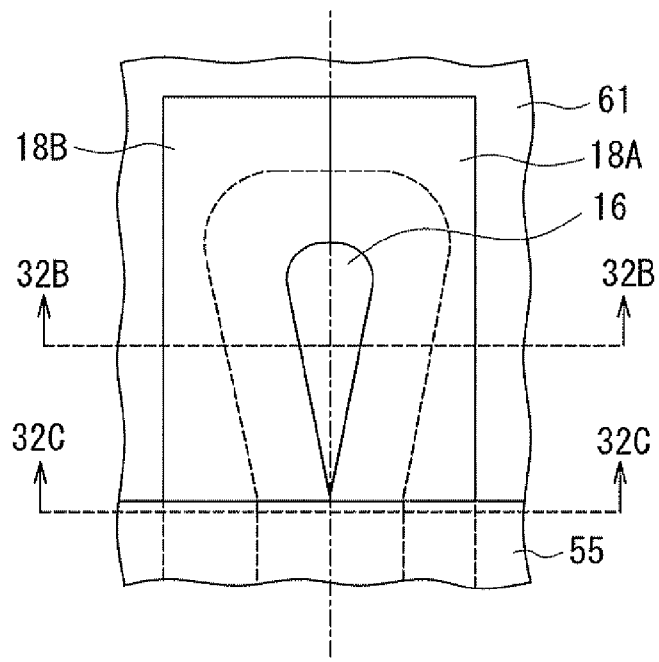
FIG. 32A to FIG. 32C are explanatory diagrams showing a step that follows the step shown in FIG. 31A to FIG. 31C.
Figure 32B:
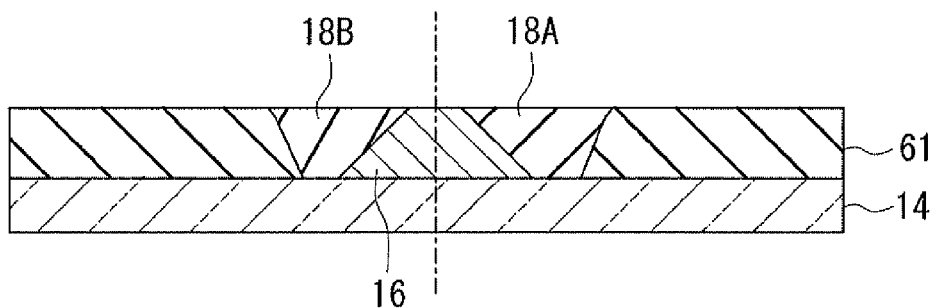
Figure 32C:
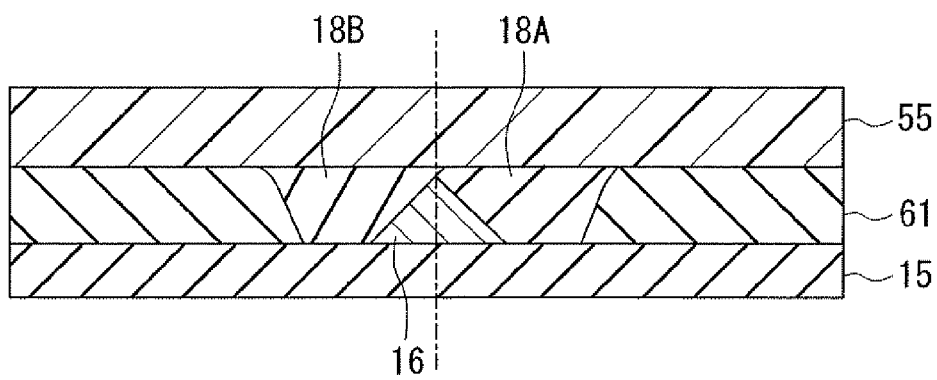

FIG. 32A to FIG. 32C show the next step. In this step, IBE or RIE, for example, is initially performed to remove the polishing stopper layer 63 and slightly etch the coating layer 18A and the second coating layer 18B so that the accommodating layer 61, the coating layer 18A, and the second coating layer 18B are flattened at the top. Subsequently, a photoresist mask 55 may be formed on top of the coating layer 18A and the second coating layer 18B at a position above the edge part 16e, and then the waveguide facing surface 16b, the coating layer 18A, and the second coating layer 18B may be slightly etched by IBE or RIE, for example. This can avoid the etching of the edge part 16e and prevent the polishing stopper layer 63 from remaining on the waveguide facing surface 16b. The coating layer 18A and the second coating layer 18B remaining after this step constitute the surrounding layer 18.

Figure 33A:
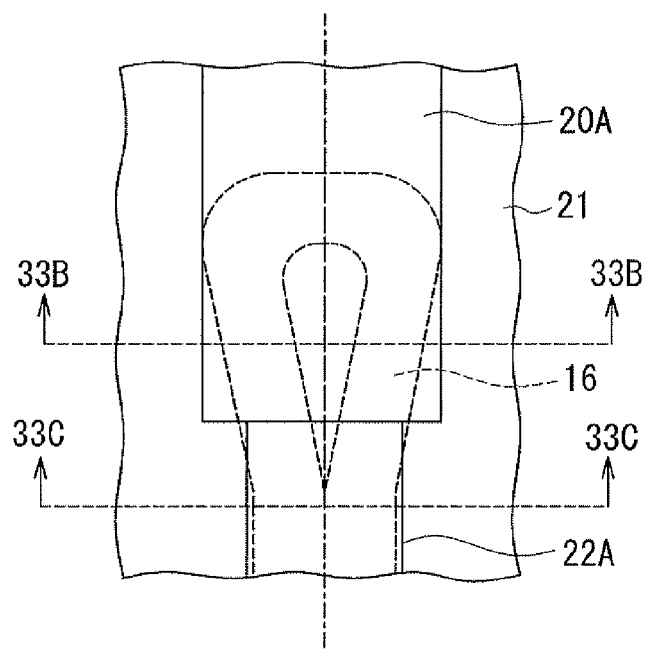
FIG. 33A to FIG. 33C are explanatory diagrams showing a step that follows the step shown in FIG. 32A to FIG. 32C.
Figure 33B:
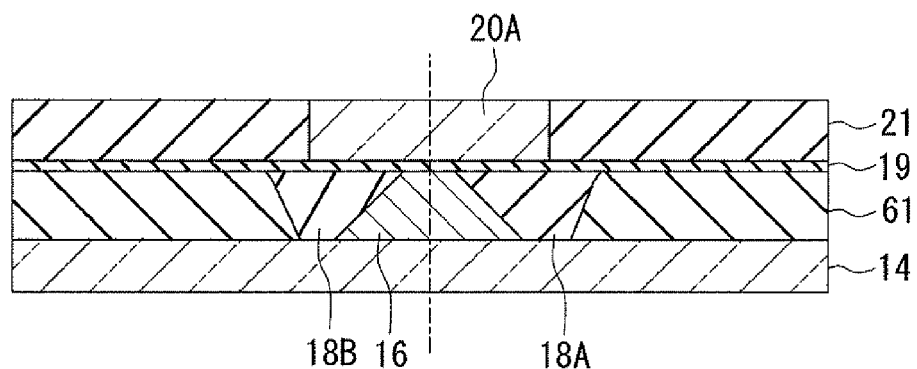
Figure 33C:
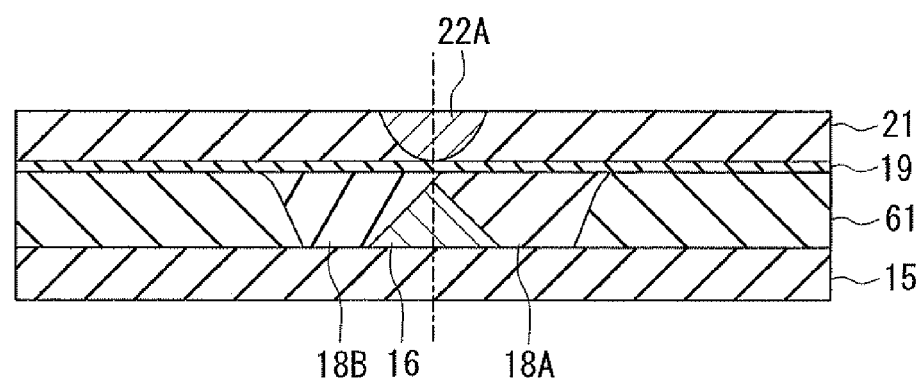

The near-field light generating element 16 and the surrounding layer 18 are formed through the series of steps shown in FIG. 22A to FIG. 32C. FIG. 33A to FIG. 33C show a step after the formation of the near-field light generating element 16 and the surrounding layer 18. In this step, the clad layer 19 is initially formed over the near-field light generating element 16 and the surrounding layer 18. Next, the clad layer 21, the first layer 22A of the magnetic pole 22, and the first layer 20A of the waveguide 20 are formed on the clad layer 19.

In the present embodiment, the second polishing stopper layer of the first embodiment is not formed. Instead, in the present embodiment, the polishing stopper layer 63 remains on the accommodating layer 61 after the second etching step. The method of manufacturing the heat-assisted magnetic recording head according to the present embodiment includes: the step of forming the second coating layer 18B to cover the accommodating layer 61, the polishing stopper layer 63, the near-field light generating element 16 and the coating layer 18A after the second etching step; the second polishing step of polishing the second coating layer 18B until the polishing stopper layer 63 is exposed; and the step of removing the polishing stopper layer 63 after the second polishing step. According to the present embodiment, it is thus possible to define the level of the top surface of the second coating layer 18B while preventing the edge part 16e of the near-field light generating element 16 from being polished. Consequently, according to the present embodiment, it is possible to precisely define the distance between the edge part 16e and the bottom end of the magnetic pole 22 and the distance between the waveguide facing surface 16b and the bottom surface of the waveguide 20.

The remainder of configuration, function and effects of the present embodiment are similar to those of the first embodiment.

[Third Embodiment]

Figure 34:
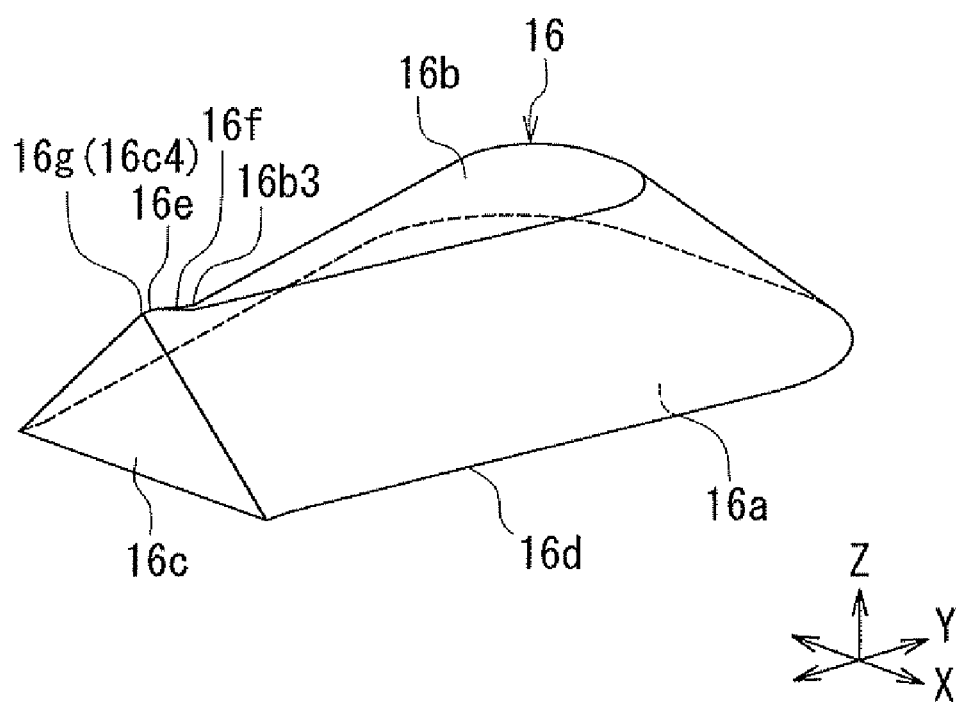
FIG. 34 is a perspective view showing a near-field light generating element according to a third embodiment of the invention.

A near-field light generating element according to a third embodiment of the invention will now be described with reference to FIG. 34. FIG. 34 is a perspective view showing the near-field light generating element according to the present embodiment. In the near-field light generating element 16 according to the present embodiment, the waveguide facing surface 16b has a front end part 16b3 that is closer to the front end face 16c. The front end part 16b3 has a small width in the X direction. The front end part 16b3 is located away from the front end face 16c. The waveguide facing surface 16b is located closer to the bottom surface 16a than is the tip 16c4 of the front end face 16c.

The outer surface of the near-field light generating element 16 according to the present embodiment includes an inclined surface 16f of triangular shape that connects the front end part 16b3 of the waveguide facing surface 16b to an end of the edge part 16e farther from the medium facing surface 40. The distance between the inclined surface 16f and the bottom surface 16a increases with decreasing distance to the medium facing surface 40.

The near-field light generating element 16 according to the present embodiment can be formed by etching the waveguide facing surface 16b by, for example, IBE or RIE, so that the inclined surface 16f is formed between the edge part 16e and the waveguide facing surface 16b. This etching is performed in the step shown in FIG. 18A to FIG. 18C of the first embodiment or the step shown in FIG. 32A to FIG. 32C of the second embodiment, using the photoresist mask 55 as the etching mask.

In the near-field light generating element 16 according to the present embodiment, surface plasmons excited on the waveguide facing surface 16b are propagated through the waveguide facing surface 16b, the inclined surface 16f, and the edge part 16e in succession, and reach the near-field light generating part 16g. The remainder of configuration, function and effects of the present embodiment are similar to those of the first embodiment.

The present invention is not limited to the foregoing embodiments, and various modifications may be made thereto. For example, in the present invention, the clad layer 19 alone may be interposed between the edge part 16e of the near-field light generating element 16 and the bottom end of the magnetic pole 22, without the intervention of the surrounding layer 18.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A method of manufacturing a near-field light generating element for use in a heat-assisted magnetic recording head, the heat-assisted magnetic recording head comprising:
a medium facing surface that faces a recording medium;
a magnetic pole that has an end face located in the medium facing surface and produces a write magnetic field for writing data on the recording medium;
a waveguide that propagates light;
the near-field light generating element, the near-field light generating element including a near-field light generating part located in the medium facing surface, a surface plasmon being excited based on the light propagated through the waveguide, the surface plasmon being propagated to the near-field light generating part, the near-field light generating part generating near-field light based on the surface plasmon; and
a substrate having a top surface,
the near-field light generating element, the magnetic pole, and the waveguide being disposed above the top surface of the substrate, wherein:
the near-field light generating element has an outer surface;
the outer surface includes: a bottom surface that lies at an end closer to the top surface of the substrate; a waveguide facing surface that lies at an end farther from the top surface of the substrate and faces the waveguide; a front end face that is located in the medium facing surface; and a side surface that connects the bottom surface, the waveguide facing surface, and the front end face to each other;
the front end face includes: a first side that lies at an end of the bottom surface; a tip that lies at an end farther from the top surface of the substrate and forms the near-field light generating part; a second side that connects an end of the first side to the tip; and a third side that connects the other end of the first side to the tip; and
the waveguide facing surface includes a width changing portion, the width changing portion having a width in a direction parallel to the bottom surface and the front end face, the width decreasing with decreasing distance to the front end face,
the method of manufacturing the near-field light generating element comprising:
a step of forming a metal layer that is to be etched later to become the near-field light generating element;
a first etching step of etching the metal layer so that the metal layer is provided with a part of the side surface continuous with the second side of the front end face; and
a second etching step of etching the metal layer so that the waveguide facing surface and the side surface are completed and the metal layer thereby becomes the near-field light generating element.

2. A method of manufacturing a near field light generating element for use in a heat-assisted magnetic recording head, the heat-assisted magnetic recording head comprising:
a medium facing surface that faces a recording medium;
a magnetic pole that has an end face located in the medium facing surface and produces a write magnetic field for writing data on the recording medium;
a waveguide that propagates light;
the near-field light generating element, the near-field light generating element including a near-field light generating part located in the medium facing surface, a surface plasmon being excited based on the light propagated through the waveguide, the surface plasmon being propagated to the near-field light generating part, the near-field light generating part generating near-field light based on the surface plasmon; and
a substrate having a top surface,
the near-field light generating element, the magnetic pole, and the waveguide being disposed above the top surface of the substrate, wherein:
the near-field light generating element has an outer surface;
the outer surface includes: a bottom surface that lies at an end closer to the top surface of the substrate; a waveguide facing surface that lies at an end farther from the top surface of the substrate and faces the waveguide; a front end face that is located in the medium facing surface; and a side surface that connects the bottom surface, the waveguide facing surface, and the front end face to each other;
the front end face includes: a first side that lies at an end of the bottom surface; a tip that lies at an end farther from the top surface of the substrate and forms the near-field light generating part; a second side that connects an end of the first side to the tip; and a third side that connects the other end of the first side to the tip; and the waveguide facing surface includes a width changing portion, the width changing portion having a width in a direction parallel to the bottom surface and the front end face, the width decreasing with decreasing distance to the front end face, the method of manufacturing the near-field light generating element comprising:

a step of forming a metal layer that is to be etched later to become the near-field light generating element;

a step of forming a polishing stopper layer on the metal layer, the polishing stopper layer being intended for use in a polishing step to be performed later;

a first etching step of etching the polishing stopper layer and the metal layer so that the metal layer is provided with a part of the side surface continuous with the second side of the front end face;

a step of forming a coating layer to cover the polishing stopper layer and the metal layer provided with the part of the side surface, the coating layer being made of a non-metallic inorganic material that has an etching rate lower than that of the metal layer in a second etching step to be performed later;

the polishing step of polishing the coating layer until the polishing stopper layer is exposed; and the second etching step of etching the polishing stopper layer and the metal layer so that the waveguide facing surface and the side surface are completed and the metal layer thereby becomes the near-field light generating element, wherein a part of the near-field light generating element including the tip is shaped by etching the metal layer in the second etching step, using the coating layer polished in the polishing step as an etching mask.

3. The method of manufacturing the near-field light generating element according to claim 2, wherein the coating layer is made of one selected from the group consisting of $Al_2O_3$, $SiO_2$, $Ta_2O_5$, SiC, and TiN.

4. A heat-assisted magnetic recording head comprising:
a medium facing surface that faces a recording medium;
a magnetic pole that has an end face located in the medium facing surface and produces a write magnetic field for writing data on the recording medium;
a waveguide that propagates light;
a near-field light generating element that has a near-field light generating part located in the medium facing surface, a surface plasmon being excited based on the light propagated through the waveguide, the surface plasmon being propagated to the near-field light generating part, the near-field light generating part generating near-field light based on the surface plasmon; and
a substrate having a top surface, wherein:
the near-field light generating element, the magnetic pole, and the waveguide are disposed above the top surface of the substrate;
the near-field light generating element has an outer surface;
the outer surface includes: a bottom surface that lies at an end closer to the top surface of the substrate; a waveguide facing surface that lies at an end farther from the top surface of the substrate and faces the waveguide; a front end face that is located in the medium facing surface; and a side surface that connects the bottom surface, the waveguide facing surface, and the front end face to each other;
the front end face includes: a first side that lies at an end of the bottom surface; a tip that lies at an end farther from the top surface of the substrate and forms the near-field light generating part; a second side that connects an end of the first side to the tip; and a third side that connects the other end of the first side to the tip;
the waveguide facing surface includes a width changing portion, the width changing portion having a width in a direction parallel to the bottom surface and the front end face, the width decreasing with decreasing distance to the front end face; and
the end face of the magnetic pole is located at such a position that the tip lies between the end face of the magnetic pole and the first side of the front end face of the near-field light generating element.

5. The heat-assisted magnetic recording head according to claim 4, wherein a cross section of the near-field light generating element parallel to the bottom surface decreases in size with increasing distance from the bottom surface.

6. The heat-assisted magnetic recording head according to claim 4, wherein:
the waveguide facing surface has a front end part that is closer to the front end face, the front end part being located away from the front end face; and
the outer surface of the near-field light generating element further includes an edge part that connects the front end part to the tip of the front end face.

7. The heat-assisted magnetic recording head according to claim 4, wherein:
the waveguide facing surface has a front end part that is closer to the front end face, the front end part being located away from the front end face; and
the waveguide facing surface is located closer to the bottom surface than is the tip of the front end face.

* * * * *